(12) United States Patent
Tang et al.

(10) Patent No.: US 11,009,517 B2
(45) Date of Patent: May 18, 2021

(54) SAMPLE RACK SCHEDULING CONTROL METHOD AND SYSTEM, AND MEDICAL DETECTION DEVICE

(71) Applicant: Shenzhen New Industries Biomedical Engineering Co., Ltd., Guangdong (CN)

(72) Inventors: Junhui Tang, Guangdong (CN); Caiqing Zhong, Guangdong (CN); Xiaotao Chen, Guangdong (CN); Jiang Li, Guangdong (CN); Shujuan Chen, Guangdong (CN); Ying Hu, Guangdong (CN)

(73) Assignee: Shenzhen New Industries Biomedical Engineering Co, Ltd, Shenzhen (CN)

( * ) Notice: Subject to any disclaimer, the term of this patent is extended or adjusted under 35 U.S.C. 154(b) by 337 days.

(21) Appl. No.: 16/203,627

(22) Filed: Nov. 29, 2018

(65) Prior Publication Data
US 2019/0204345 A1    Jul. 4, 2019

(30) Foreign Application Priority Data

Dec. 28, 2017   (CN) .......................... 201711467198.4

(51) Int. Cl.
*G01N 35/00*     (2006.01)
*G01N 35/10*     (2006.01)
(Continued)

(52) U.S. Cl.
CPC ... *G01N 35/0092* (2013.01); *G01N 35/00722* (2013.01); *G01N 35/026* (2013.01); *G01N 35/04* (2013.01); *G01N 35/10* (2013.01); *G01N 2035/0413* (2013.01); *G01N 2035/0465* (2013.01); *G01N 2035/0484* (2013.01)

(58) Field of Classification Search
CPC .......... G01N 2035/0484; G01N 35/04; G01N 35/00722; G01N 35/10; G01N 2035/0413; G01N 35/0092; G01N 2035/0465; G01N 35/026
See application file for complete search history.

(56) References Cited

U.S. PATENT DOCUMENTS 3,713,771 A * 1/1973 Taylor ................ A61B 10/0096
                                                        436/48
5,282,149 A * 1/1994 Grandone ........ G01N 35/00732
                                                        702/19

(Continued)

*Primary Examiner* — Shogo Sasaki
(74) *Attorney, Agent, or Firm* — Yu Gang

(57) ABSTRACT

Some embodiments of the disclosure provide a sample rack scheduling control method. The method includes the following steps: respectively obtaining a state of each position node on each preset delivery path, wherein the state of each position node includes an available state and an occupancy state; and for each of the delivery paths, if a target position node on the delivery path and position nodes between the target position node and a start position node all are in the available state, marking the target position node on the delivery path and the position nodes between the start position node and the target position node all as the occupancy state, and controlling a current sample rack at the start position node to move to the target position node. The present disclosure further provides a sample rack scheduling control system and a medical detection device.

20 Claims, 9 Drawing Sheets

(51) Int. Cl.
  *G01N 35/04*  (2006.01)
  *G01N 35/02*  (2006.01)

(56) References Cited

U.S. PATENT DOCUMENTS

| | | | |
|---|---|---|---|
| 5,576,215 A * | 11/1996 | Burns | G01N 35/0092 |
| | | | 422/116 |
| 2004/0186360 A1* | 9/2004 | Suzuki | G01N 35/026 |
| | | | 600/310 |
| 2010/0107744 A1* | 5/2010 | Fukuda | G01N 35/1065 |
| | | | 73/64.56 |
| 2016/0202854 A1* | 7/2016 | Minato | G06F 3/04842 |
| | | | 715/773 |
| 2017/0153261 A1* | 6/2017 | Chida | G01N 35/04 |
| 2018/0080949 A1* | 3/2018 | Jost | G01N 35/0092 |
| 2019/0277869 A1* | 9/2019 | Stein | G01N 35/026 |
| 2019/0344262 A1* | 11/2019 | Martin | B01L 3/5025 |

* cited by examiner

SAMPLE RACK SCHEDULING CONTROL METHOD AND SYSTEM, AND MEDICAL DETECTION DEVICE

CROSS REFERENCE TO RELATED APPLICATION

This application is related to and claims the benefit of Chinese Patent Application Number 201711467198.4 filed on Dec. 28, 2017, the contents of which are herein incorporated by reference in their entirety.

TECHNICAL FIELD

The present disclosure relates to a technical field of in-vitro diagnostic devices, and more particularly to a sample rack scheduling control method and system, and a medical detection device.

BACKGROUND

A chemiluminescence immunoassay is an in-vitro detection analysis technology in combination of antigen-antibody immunoreaction and luminous reaction. With an immunology theory as a basis and a luminous marker as a tracing signal, and through collecting an optical signal to detect a plurality of markers, it has the advantages of high sensitivity, low nonspecific adsorption and high accuracy. Along with the high-speed development of a biomedical device, certain conditions for implementing complete automation of a chemiluminescence detector have been achieved.

Generally, the chemiluminescence detector includes a sample bin mechanism used for loading samples. However, for a modular device, different samples need to reach to different instruments, and thus a rail type sample delivery apparatus is adopted generally to automatically deliver the samples. Compared with a fixed type sample bin mechanism, the rail type sample delivery apparatus needs to deliver the samples, so an utilization rate of a rail type delivery is relatively low in general and the sample adding of the instruments is delayed, resulting in that the overall throughput of the instruments is reduced.

SUMMARY

In view of a current situation of the related art, the present disclosure is intended to provide a sample rack scheduling control method and system, and a medical detection device, thereby improving the delivery efficiency of sample racks and the utilization rate of a sample delivery rail.

To this end, the technical solutions adopted by the present disclosure are as follows.

A sample rack scheduling control method includes the following steps:

a state of each position node on each preset delivery path is respectively obtained, wherein the state of the each position node include an available state and an occupancy state and the each preset delivery path includes a start position node and a target position node; and for each of the delivery paths, if a target position node on the delivery path and position nodes between the target position node and a start position node all are in the available state, the target position node on the delivery path and the position nodes between the start position node and the target position node all are marked as the occupancy state, and a current sample rack at the start position node is controlled to move to the target position node;

wherein the start position node is a first position node on the delivery path, an initial state of the start position node is in the occupancy state, and the target position node is a last one position node on the delivery path.

In one embodiment, the method further includes the following step:

for the each of the delivery paths, if the target position node on the delivery path and/or the position nodes between the target position node and the start position node are in the occupancy state, the current sample rack is controlled to be unmovable at the start position node of the delivery path till the target position node on the delivery path and the position nodes between the target position node and the start position node are in the available state.

In one embodiment, the method includes the following steps:

a current position node of a current sample rack on the each delivery path is obtained in real time; and if the state of the current position node of the current sample rack is updated once, a previous one position node prior to the current position node is marked as the available state.

In one embodiment, the method includes the following steps:

whenever a state of the position node is changed into the available state, a resource release signal corresponding to the position node is generated and sent;

and according to the resource release signal corresponding to each of the position nodes, a state of the each position node on the each preset delivery path is obtained.

In one embodiment, the method includes the following steps:

a total number of sample racks at the start position node on the each delivery path is respectively obtained;

and for the each of the delivery paths, if the total number of sample racks at the start position node on the delivery path is greater than zero, the total number of sample racks at the start position node on the delivery path is controlled to decrease progressively once, and one of the sample racks at the start position node on the delivery path is taken as a current sample rack.

In one embodiment, the method includes the following step:

if a target position node of one delivery path is overlapped with a start position node of another delivery path, when a sample rack on the one delivery path is moved to the corresponding target position node, a total number of sample racks at the start position node on the another delivery path is controlled to accumulate once.

In one embodiment, each of the position nodes includes a sample rack start-stop position, a transfer position, a sample adding buffer position, a conventional sample adding position, an emergency sample adding position, a rail changing position and a recycling buffer position provided on a single detection instrument.

When a plurality of detection instruments are spliced together, the plurality of detection instruments share the sample rack start-stop position and the transfer position corresponding to the first detection instrument; and the first detection instrument is connected with a sample bin mechanism.

In one embodiment, the each delivery path includes a first delivery path, a second delivery path, a third delivery path and a fourth delivery path;

a start position node of the first delivery path is the sample rack start-stop position, a target position node of the first delivery path is the sample adding buffer position or the emergency sample adding position corresponding to a first target detection instrument, and position nodes between the start position node and the target position node include the transfer position.

a start position node of the second delivery path is the sample adding buffer position, and a target position node of the second delivery path is the conventional sample adding position located on a same detection instrument with the sample adding buffer position.

a start position node of the third delivery path is the conventional sample adding position or the emergency sample adding position, a target position node of the third delivery path is the recycling buffer position located on a same detection instrument with the conventional sample adding position and the emergency sample adding position, and position nodes between the start position node and the target position node include the rail changing position located on a same detection instrument with the conventional sample adding position and the emergency sample adding position.

a start position node of the fourth delivery path is the recycling buffer position on the first detection instrument, a target position node of the fourth delivery path is the sample rack start-stop position, and position nodes between the start position node and the target position node include the transfer position.

In one embodiment, the each delivery path includes a fifth delivery path and a sixth delivery path;

a start position node of the fifth delivery path is a conventional sample adding position on an $i^{th}$ detection instrument, and a target position node of the fifth delivery path is a sample adding buffer position on a second target detection instrument, or a start position node of the fifth delivery path is an emergency sample adding position of an $i^{th}$ detection instrument, and a target position node of the fifth delivery path is an emergency sample adding position on a second target detection instrument, wherein position nodes between the start position node and the target position node include rail changing positions of n detection instruments, the n is the number of instruments between the second target detection instrument and the $i^{th}$ detection instrument, n≥1, and the n is a positive integer.

a start position node of the sixth delivery path is a recycling buffer position on an $(i+1)^{th}$ detection instrument, a target position node of the sixth delivery path is a recycling buffer position corresponding to the $i^{th}$ detection instrument, and position nodes between the start position node and the target position node include a rail changing position of the $i^{th}$ detection instrument, wherein 1≤i≤N, the i is the positive integer, the N is the total sets of the detection instruments, N≥2 and the N is the positive integer.

In one embodiment, when the method is used in a device including a plurality of detection instruments, the method includes the following step:

for each detection instrument, when each of the sample racks is moved to an emergency sample adding position or a conventional sample adding position of the detection instrument, a sample adding mechanism of the detection instrument is controlled to suck up a sample.

Meanwhile, the present disclosure provides a sample rack scheduling control system. The sample rack scheduling control system includes a processor and a memory used for storing a computer program; and when the processor executes the computer program, any method above is executed.

Some embodiments of the present disclosure provide a sample rack scheduling control system. The sample rack scheduling control system includes:

a plurality of delivery path management modules, each delivery path management module being used for obtaining a state of each position node on each preset delivery path, wherein the state of the each position node includes an available state and an occupancy state and the each preset delivery path includes a start position node and a target position node; and a control module, for each of the delivery paths, if a target position node on the delivery path and position nodes between the target position node and a start position node all are in the available state, used for marking the target position node on the delivery path and the position nodes between the start position node and the target position node all as the occupancy state, and control a current sample rack at the start position node to move to the target position node, wherein the start position node is a first position node on the delivery path, an initial state of the start position node is in the occupancy state, and the target position node is a last one position node on the delivery path.

In addition, some embodiments of the present disclosure provide a medical detection device. The medical detection device includes one or more detection instruments and the above sample rack scheduling control system.

The present disclosure achieves the following beneficial effects.

According to the sample rack scheduling control method and system, and the medical detection device provided by the present disclosure, through providing a plurality of position nodes, a total movement path of the sample racks may be divided into multiple delivery paths. When the target position node on each delivery path and the position nodes between the target position node and the start position node all are in the available state, it indicates that the delivery path is unblocked; at this moment, each of the position nodes on the delivery path can be marked as the occupancy state, and the sample racks at the start position node on the delivery path are controlled to move to the target position node. In this way, as long as the delivery path is unblocked, the sample racks can be started to be delivered; and thus, the parallel delivery for a plurality of sample racks is implemented, there is no need to wait to deliver a next sample rack after a previous one is delivered completely, the utilization rate of each transmission channel on the sample delivery apparatus is improved, and the delivery efficiency of the sample racks is improved.

DETAILED DESCRIPTION OF THE EMBODIMENTS

In order for clearer explanations of technical solutions of the present disclosure, the sample rack scheduling control method and system and the medical detection device of the present disclosure will be described below in detail with reference to accompanying drawings. It should be understood that the specific embodiments described herein are only for the purpose of explaining the present disclosure but not for limiting the present disclosure. It is to be noted that, the embodiments of the present disclosure and characteristics in the embodiments may be combined to each other if there is no conflict.

It should be noted that, numbers of the components in itself such as "first" and "second" described herein are only used to distinguish description objects, rather than to describe a special order or a technical meaning. "Connection" and "interconnection" described herein all include direct and indirect connection (interconnection) unless otherwise specified. As described herein, it should be understood that, a direction or positional relationship indicated by terminologies such as "upper", "lower", "front", "rear", "left", "right", "vertical", "horizontal", "top", "bottom", "inside", "outside", "clockwise" and "counterclockwise" is a direction or positional relationship indicated based on the accompanying drawings, and is only for describe the present disclosure conveniently and simplify the description and does not indicate or imply that the device or component must have a special direction and is not constructed and operated in the special direction, and thus is not understood as the limit of the present disclosure.

As used herein, unless otherwise specified and limited clearly, the first characteristic is "above" or "below" the second characteristic, which may be that the first and second characteristics are directly contacted, or the first and second characteristics are indirectly contacted via an intermediary. Moreover, the first characteristic is "on", "above" and "over" the second characteristic, which may be that the first characteristic is above or at an inclined top of the second characteristic, or only indicates that the first characteristic is horizontally higher than the second characteristic. Moreover, the first characteristic is "under", "below" and "beneath" the second characteristic, which may be that the first characteristic is below or at an inclined bottom of the second characteristic, or only indicates that the first characteristic is horizontally lower than the second characteristic.

Figure 1:
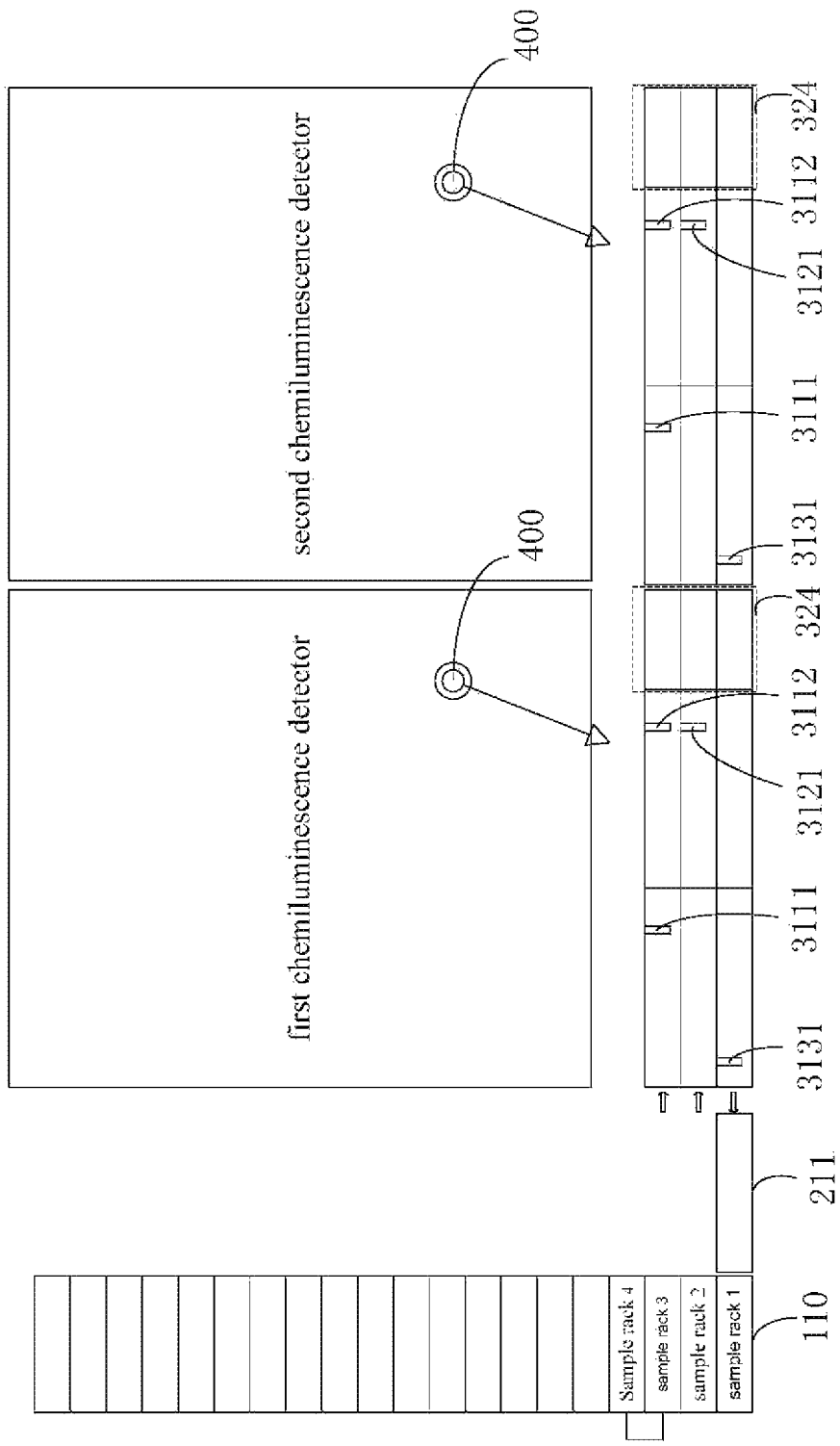
FIG. 1 is a schematic diagram of a medical detection device of one embodiment of the present disclosure.
Figure 2:
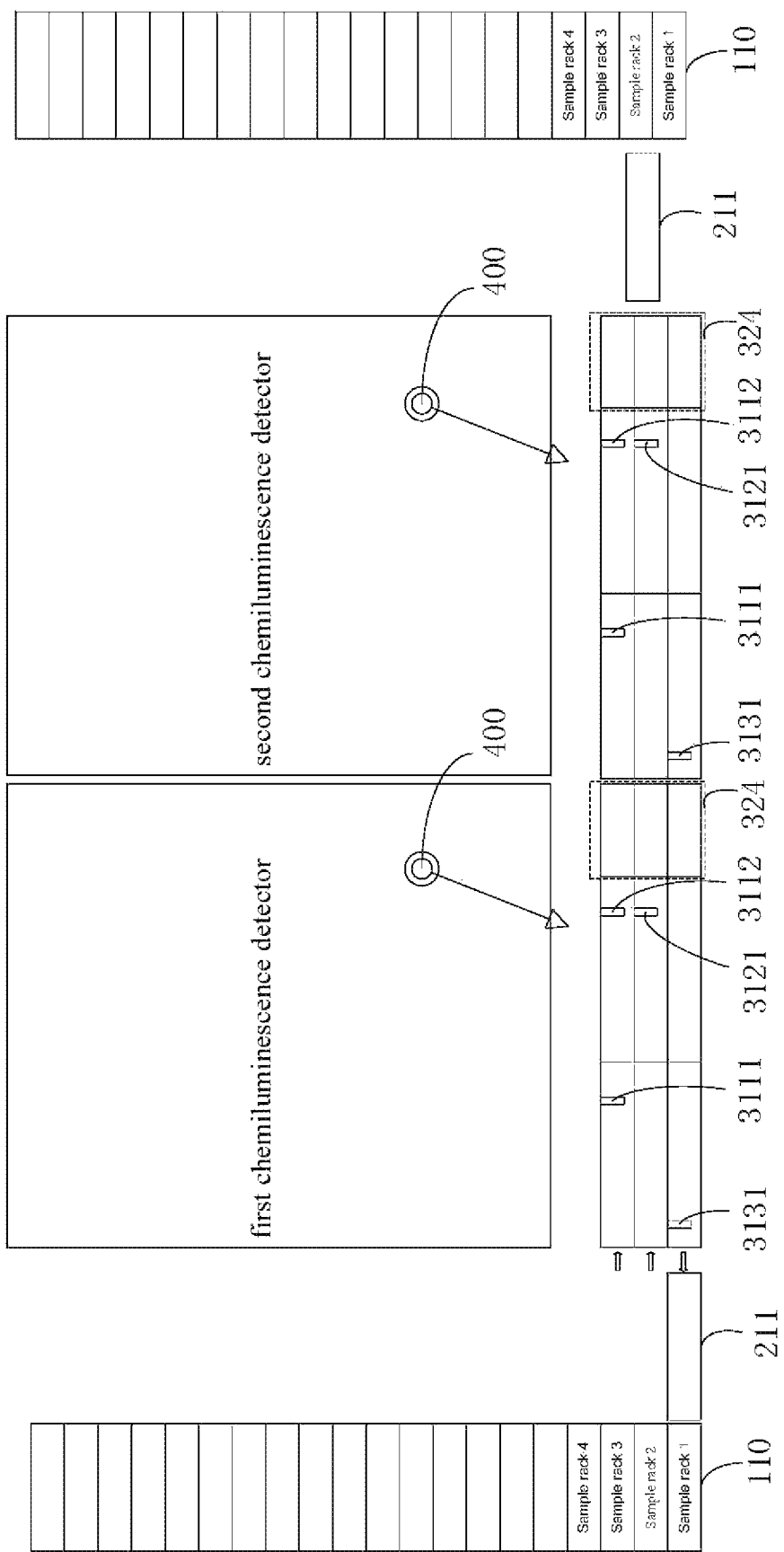
FIG. 2 is a schematic diagram of a medical detection device of another embodiment of the present disclosure.

As shown in FIG. 1 and FIG. 2, some embodiments of the present disclosure provide a medical detection device. The medical detection device can treat a sample and performs analysis detection on a treated sample to obtain a corresponding detection result and meet the use requirement. It is to be noted that, the specific type of a to-be-tested sample is not limited. In some embodiments, the to-be-tested sample includes a solid sample or a liquid sample. Further, the liquid sample includes but not limited to a blood sample. In this embodiment, the medical detection device performs reagent adding, uniform mixing and incubating operations according to requirements on treatment time sequences of different samples. In this way, the treatment requirements of the different samples can be met, the sample and the reagent can be fully reacted, and the accuracy of the sample detection result is improved.

In an exemplary embodiment, the medical detection device includes one or more detection instruments. A plurality of detection instruments may be spliced in use. In an exemplary embodiment, when the medical detection device is spliced by a plurality of detection instruments, the medical detection device may be one or more combinations of in-vitro diagnostic instruments such as a chemiluminescence detector, an electrolyte instrument and a biochemical instrument. Hereinafter, with a plurality of chemiluminescence detectors as an example for illustration, other splicing manners can be referred to a manner through which the plurality of chemiluminescence detectors are spliced and will not be described one by one in this embodiment of the present disclosure.

In an exemplary embodiment, the medical detection device may include one or more chemiluminescence detectors. The multiple chemiluminescence detectors may be spliced together. Wherein, each chemiluminescence detector may include a sample adding mechanism 400, and the each chemiluminescence detector may be correspondingly provided with a sample bin mechanism 100 and a sample delivery apparatus. Wherein, the sample bin mechanism 100 is used for storing a plurality of sample racks loaded with samples. The sample racks stored in the sample bin mechanism 100 can be transferred to the sample delivery apparatus. The sample delivery apparatus is used for conveying the samples in the sample bin mechanism 100 to sample adding positions, and the sample adding mechanism 400 sucks up the samples at the sample adding positions. In an exemplary embodiment, the sample adding positions may include a conventional sample adding position for a conventional sample and an emergency sample adding position for an emergency sample, so that the sample adding mechanism is controlled according to a sample type to rotate to a corresponding sample adding position to suck up the sample.

Figure 3:
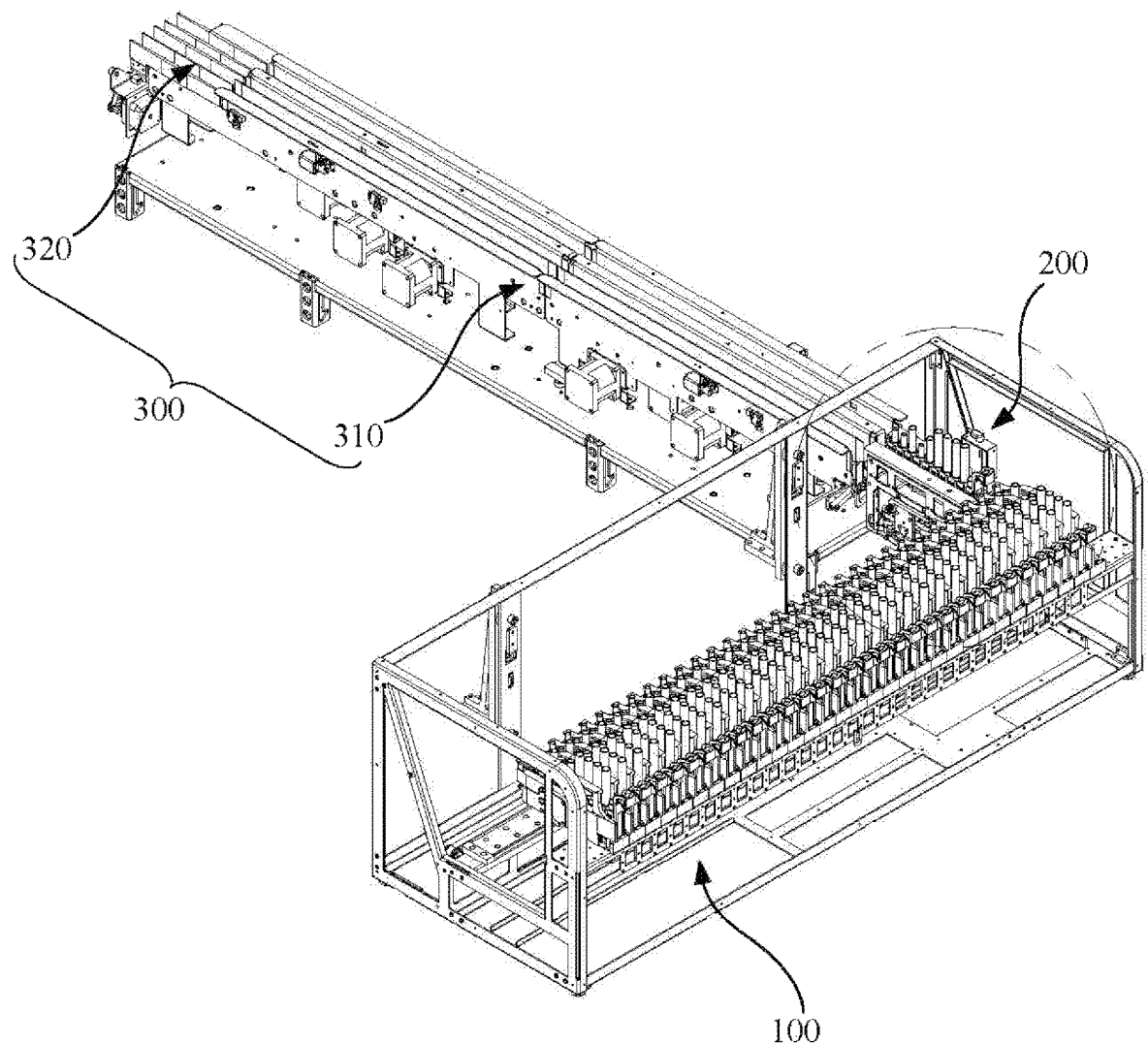
FIG. 3 is a structural schematic diagram of a sample rack delivery apparatus of one embodiment of the present disclosure.
Figure 4:
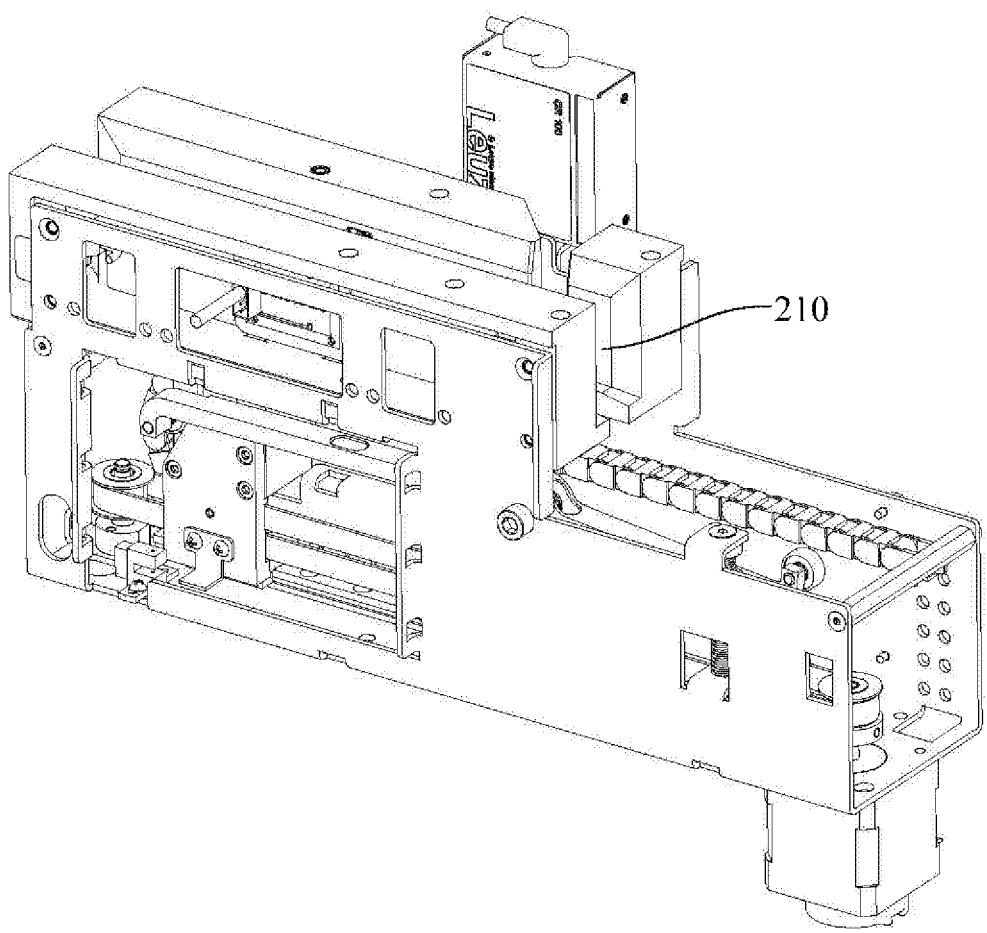
FIG. 4 is a structural schematic diagram of one embodiment of a transfer unit in the sample rack delivery apparatus of FIG. 3.

In an exemplary embodiment, as shown in FIG. 3, the sample delivery apparatus includes a sample transfer mechanism 200 and a sample delivery mechanism 300, the sample transfer mechanism 200 is provided between the sample bin mechanism 100 and the sample delivery mechanism 300, and through the sample transfer mechanism 200, the sample racks in the sample bin mechanism 100 are transferred to the sample delivery mechanism 300. In an exemplary embodiment, the sample bin mechanism 100 is provided with a delivery port, so that the sample racks in the sample bin mechanism 100 are transferred to the sample transfer mechanism 200 by the delivery port and are delivered to the sample delivery mechanism 300 by the sample transfer mechanism 200. In an exemplary embodiment, as shown in FIG. 2, the sample transfer mechanism 200 may include a transfer rail 210. When a passage is formed between the transfer rail 210 of the sample transfer mechanism 200 and the delivery port of the sample bin mechanism 100, the sample racks stored in the sample bin mechanism 100 may be transferred to the sample transfer mechanism 200, and thus the sample transfer mechanism 200 can transfer the sample racks to the sample delivery mechanism 300.

Figure 5:
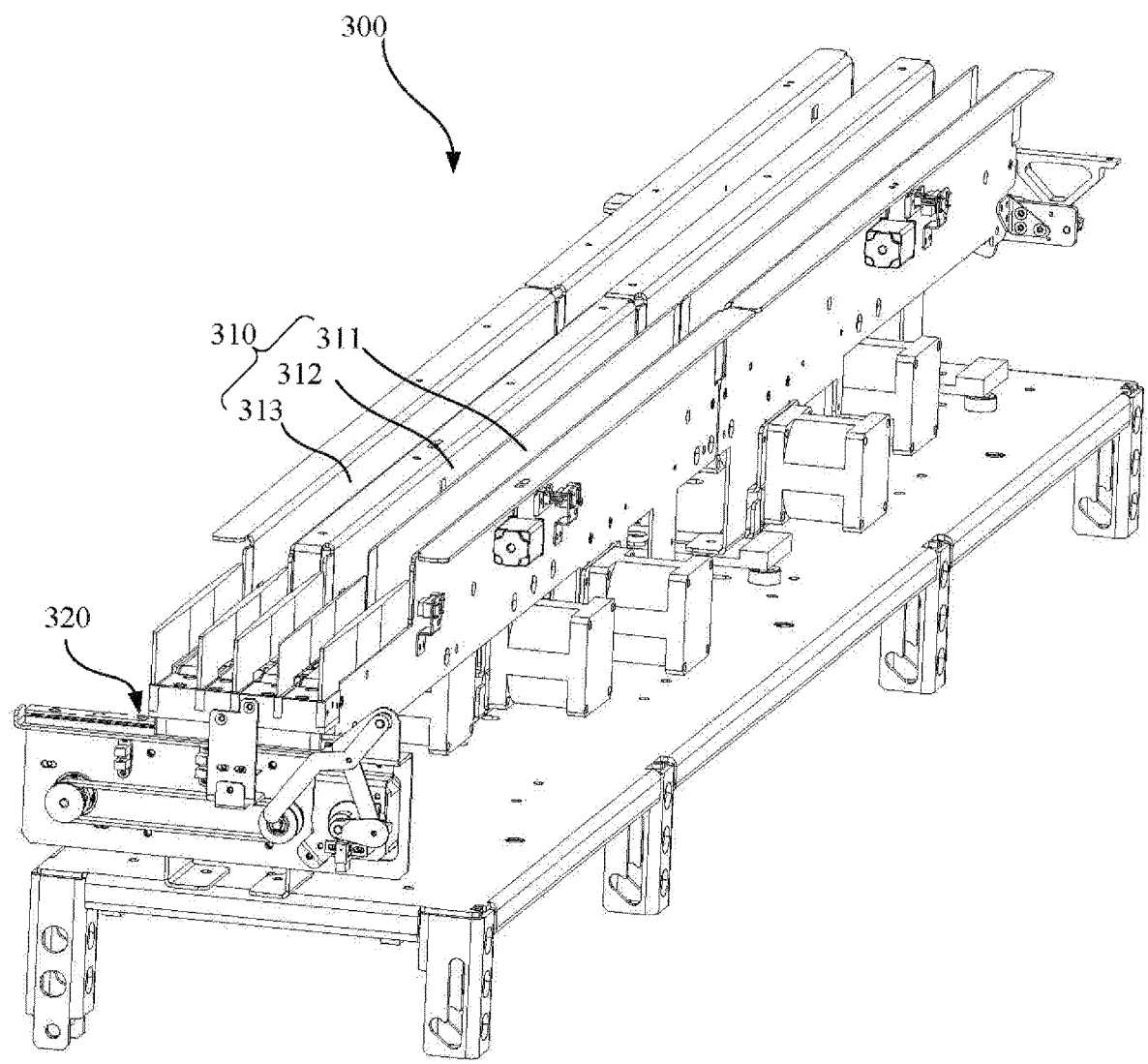
FIG. 5 is a structural schematic diagram of one embodiment of a rail component in the sample rack delivery apparatus of FIG. 3.

In an exemplary embodiment, as shown in FIG. 5, the sample delivery mechanism 300 includes a rail component 310 and a rail changing structure 320. Wherein, the sample transfer mechanism 200 can be in abutment joint with transmission passages of the rail component 310, so that the sample transfer mechanism 200 transfers the sample racks to the transmission passages of the rail component 310. In an exemplary embodiment, the rail component 310 implements a delivery of the sample racks using a synchronous belt structure and the like. In an exemplary embodiment, the rail component 310 may include a first transmission passage 311, a second transmission passage 312 and a third transmission passage 313, and the first transmission passage 311, the second transmission passage 312 and the third transmission passage 313 are provided in parallel. Through the rail changing structure 320, the sample racks can be transferred among a plurality of transmission passages of the rail component. For example, through the rail changing structure 320, the sample racks in the first transmission passage 311 or the second transmission passage 312 can be transferred to the third transmission passage 313.

Figure 6:
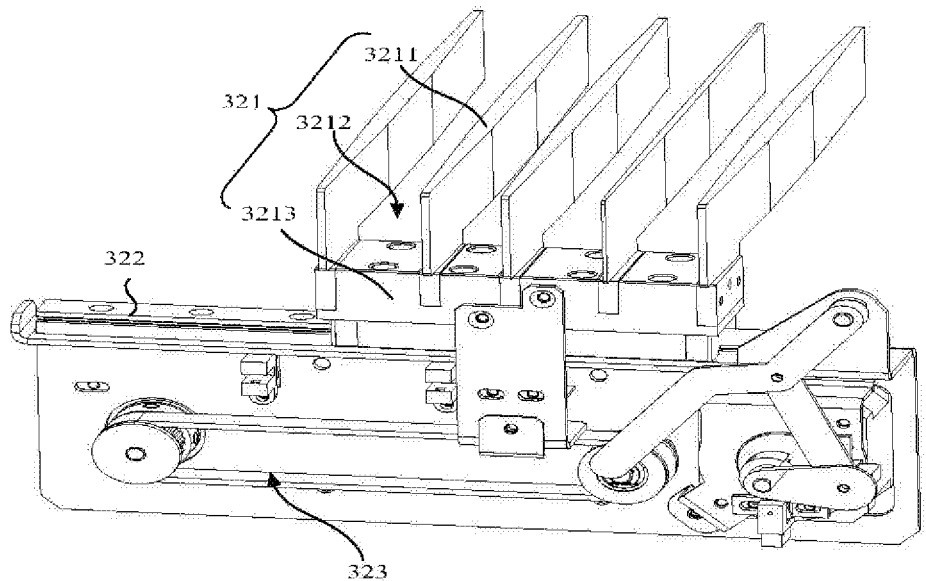
FIG. 6 is a structural schematic diagram of one embodiment of a rail changing mechanism in the rail component of FIG. 5.

In an exemplary embodiment, as shown in FIG. 6, the rail changing structure 320 includes a shifting fork piece 321, a transverse guide rail 322 and a shifting fork driving mechanism 323. The shifting fork driving mechanism 323 is used for driving the shifting fork piece 321 to transversely move along the transverse guide rail 322 at a sample rack output port (perpendicular to an extension direction of the transmission passage) of the transmission passage, and thus the sample racks are moved to other transmission passages and the sample racks can be delivered in different transmission passages. In an exemplary embodiment, the shifting fork piece 321 includes a plurality of push plates 3211 provided at intervals. One ends of the plurality of push plates 3211 are slideably connected with the transverse guide rail 322 by a sliding seat 3213, and the other ends of the plurality of push plates 3211 are stretched parallel to an extension direction of the transmission passage. A groove 3212 to which the sample racks can be moved is formed between adjacent push plates 3 211. When the sample racks are moved to the groove 3212 from one transmission passage of the rail component 310, the shifting fork driving mechanism 323 drives the shifting fork piece 321 to move along the transverse guide rail 322, so that the push plates 3211 push the sample racks to other transmission passages of the rail component and thus the transmission of the sample racks in different transmission passages is implemented. In an exemplary embodiment, the shifting fork driving mechanism 323 is using the synchronous belt structure and the like.

In this embodiment, when the sample delivery apparatus delivers a sample, the sample transfer mechanism 200 selects a to-be-tested sample rack, and transports the sample rack to the transmission passage of the rail component 310 of the sample delivery mechanism 300; and through the rail component 310, the sample rack is delivered to the sample adding position (the conventional sample adding position or the emergency sample adding position). When the sample adding mechanism 400 samples completely, the rail changing structure 320 changes the transmission passages of sample racks which sample completely, thereby delivering the sample racks which sample completely to one end, connected with the sample transfer mechanism 200, of the sample delivery mechanism 300, and conveying the sample racks which sample completely to the sample bin mechanism 100 by the sample transfer mechanism 200.

In an exemplary embodiment, the each chemiluminescence detector are correspondingly provided with a plurality of position nodes. The plurality of position nodes are used for identifying positions where the sample racks may be stayed. As shown in FIG. 1, according to delivery paths of the sample racks, the plurality of position nodes are sequentially marked as a sample rack start-stop position 110, a transfer position 211, a sample adding buffer position 3111 or an emergency sample adding position 3121, a conventional sample adding position 3112, a rail changing position 324 and a recycling buffer position 3131. Wherein, the sample rack start-stop position 110 refers to a corresponding position when each of the sample racks is in the sample bin mechanism 100. The transfer position 211 refers to a corresponding position when the each of the sample racks is on the sample transfer mechanism 200. The rail changing position 324 refers to a corresponding position when the each of the sample racks is on the rail changing structure 320 of the corresponding chemiluminescence detector. In an exemplary embodiment, there is one transfer position 211 and one rail changing position 324.

The sample adding buffer position 3111, the emergency sample adding position 3121, the conventional sample adding position 3112 and the recycling buffer position 3131 are provided on the rail component 310 of the same chemiluminescence detector, wherein the sample adding buffer position 3111 and the conventional sample adding position 3112 are provided on the first transmission passage 311. The sample racks are moved to the conventional sample adding position 3112 after passing through the sample adding buffer position 3111, and the sample adding mechanism 400 sucks up the sample in a test tube placed on the sample rack at the conventional sample adding position 3112. Through providing the sample adding buffer position 3111, the sample racks may be conveyed in advance, thereby improving the detection efficiency. In an exemplary embodiment, there is one or more sample adding buffer positions 3111. The emergency sample adding position 3121 is provided on the second transmission passage 312, that is, the second transmission passage 312 is taken as an emergency passage. When each of the sample racks is moved to the emergency sample adding position 3121, the sample adding mechanism 400 may suck up the sample in a test tube placed on the sample rack at the emergency sample adding position 3121. The sample racks for the conventional samples (the sample racks for non-emergency samples) cannot be stayed on the second transmission passage 312. The recycling buffer position 3131 is provided on the third transmission passage 313. The third transmission passage 313 is taken as a recycling passage. The sample racks are returned to the sample bin mechanism 100 by the recycling buffer position 3131.

In an exemplary embodiment, when a plurality of chemiluminescence detectors are spliced in use, a first end of the sample delivery mechanism 300 can be in abutment joint with the sample bin mechanism 100 by the sample transfer mechanism 200, or is in abutment joint with a second end of a sample delivery mechanism 300 of another chemiluminescence detector. A second end of the sample delivery mechanism 300 is in abutment joint with a first end of a sample delivery mechanism 300 of another chemiluminescence detector. In other words, the plurality of chemiluminescence detectors share the sample transfer mechanism 200 and the sample bin mechanism 100. Through the sample transfer mechanism of one chemiluminescence detector, samples are delivered to sample delivery mechanisms of the plurality of chemiluminescence detectors, thereby implementing the production line operation. Correspondingly, when the plurality of chemiluminescence detectors are spliced in use, the plurality of chemiluminescence detectors share the sample rack start-stop position 110 and the transfer position 211. In this embodiment, for each chemiluminescence detector, the second end of the sample delivery mechanism corresponding to the chemiluminescence detector refers to the end connected with the rail changing structure 320, that is, the end close to a rail changing position is taken as the second end of the sample delivery mechanism. The first end of the sample delivery mechanism corresponding to the chemiluminescence detector is the end far away from the rail changing structure 320, that is, the end close to the sample adding buffer position or the emergency sample adding position is taken as the first end of the sample delivery mechanism.

As shown in FIG. 1, with two spliced chemiluminescence detectors as an example, a first end of a sample delivery mechanism 300 of a first chemiluminescence detector is in abutment joint with a sample bin mechanism 100 by a sample transfer mechanism 200, and a second end of the sample delivery mechanism 300 of the first chemiluminescence detector is in abutment joint with a first end of a sample delivery mechanism of a second chemiluminescence detector. The two chemiluminescence detectors share one sample bin mechanism 100 and one sample transfer mechanism 200. Correspondingly, there are one sample rack start-stop position 110 and one transfer position 211. Position nodes such as a sample adding buffer position 3111, a conventional sample adding position 3112, an emergency sample adding position 3121, a rail changing position 324 and a recycling buffer position 3131 are provided on a sample delivery apparatus of each of the chemiluminescence detectors.

In an exemplary embodiment, through the position nodes, a total movement path in a sample rack delivery process is divided into a plurality of delivery paths. Wherein, the state of each of the position nodes may be an occupancy state or an available state. When the position node is in the occupancy state, it indicates that the sample rack is stayed at the position node. When the position node is in the available state, it indicates that the position node is in an idle state and is not occupied by any sample rack. For example, through the each of the position nodes, the total movement path of the sample rack may be divided into a first delivery path, a second delivery path, a third delivery path, a fourth delivery path, a fifth delivery path and a sixth delivery path.

Wherein, the first delivery path can be the sample start-top position to the sample adding buffer position or the emergency sample adding position of a first target chemiluminescence detector, the second delivery path may be the sample adding buffer position to the conventional sample adding position of a same chemiluminescence detector, the third delivery path may be the conventional sample adding position to the recycling buffer position of a same chemiluminescence detector, and the fourth delivery path may be the recycling buffer position to the sample rack start-stop position of a first chemiluminescence detector. Therefore, when each of the delivery paths is idle, different sample racks may be respectively delivered on the each of the delivery paths, and thus a plurality of different sample racks are delivered simultaneously, and an utilization rate of the rail component and a sample delivery efficiency of the device are improved.

In an exemplary embodiment, the fifth delivery path may be the conventional sample adding position corresponding to an $i^{th}$ chemiluminescence detector to the sample adding buffer position corresponding to a second target chemiluminescence detector, or the fifth delivery path is the emergency sample adding position corresponding to the $i^{th}$ chemiluminescence detector to the emergency sample adding position corresponding to the second target chemiluminescence detector. The sixth delivery path may be the corresponding recycling buffer position on an $(i+1)^{th}$ chemiluminescence detector to the recycling buffer position corresponding to the $i^{th}$ chemiluminescence detector. Wherein, there are N chemiluminescence detectors (N≥2, the N is the positive integer), 1≤i≤N and the i is the positive integer.

In an exemplary embodiment, if a target movement position of a current sample rack is the sample adding position (the emergency sample adding position or the conventional sample adding position) corresponding to an $N^{th}$ chemiluminescence detector (N≥2, the N is the positive integer) and emergency sample adding positions 3121 of previous N-1 chemiluminescence detectors are idle, the current sample rack may be delivered to the sample adding position of the $N^{th}$ chemiluminescence detector by a delivery path formed by second transmission passages 312 of the plurality of chemiluminescence detectors. In this way, when the conventional sample adding position on an $(N-1)^{th}$ chemiluminescence detector is in the occupancy state, the sample rack still is delivered by the second transmission passages of the plurality of chemiluminescence detectors; and therefore, the plurality of sample racks can be delivered simultaneously by the medical detection device, and the detection efficiency is improved.

In an exemplary embodiment, the medical detection device further includes a control system. The control system is used for controlling automatic delivery of the sample racks. Of course, the control system further may control the movement of apparatuses such as the sample adding mechanism 400 on each of the chemiluminescence detectors. In an exemplary embodiment, the medical detection device may obtain the state of each of the position nodes, wherein the states of the position nodes may be the occupancy state or the available state; when the position node is in the occupancy state, it indicates that the sample rack is stayed at the position node, and when the position node is in the available state, it indicates that the position node is in an idle state and is not occupied by any sample rack. When a plurality of position nodes are in the available state, it indicates that a delivery path formed by the plurality of position nodes is unblocked. At this moment, by controlling the sample racks at a start position node of the delivery path to move to a last one position node on the delivery path, the parallel automatic delivery of the multiple sample racks may be implemented, wherein an initial state of the start position node on the delivery path is the occupancy state. When a delivery path only includes two position nodes, namely, only includes a start position node and a last one target position node, as long as the last one target position node is in the available state, it indicates that the delivery path is unblocked. At this moment, by controlling the sample racks at the start position node of the delivery path to move to the last one target position node of the delivery path, the parallel automatic delivery of the multiple sample racks may be implemented, wherein an initial state of the start position node of the delivery path is the occupancy state.

In an exemplary embodiment, in order to facilitate the parallel control on each of the delivery paths, the control system includes a plurality of delivery path management modules and a control module. The control module is used for controlling start or end of the delivery of the sample racks. In an exemplary embodiment, the control module further is used for controlling each of the delivery path management modules. The plurality of delivery path management modules are provided corresponding to the plurality of delivery paths. Each delivery path management module is used for recording a total number of sample racks at a start position node on a corresponding delivery path, and when the corresponding delivery path is unblocked, control the delivery path to deliver the sample racks according to a preset sequence. For example, the control system includes a first delivery path management module used for managing the first delivery path, a second delivery path management module used for managing the second delivery path, a third delivery path management module used for managing the third delivery path, a fourth delivery path management module used for managing the fourth delivery path, a fifth delivery path management module used for managing the fifth delivery path, a sixth delivery path management module used for managing the sixth delivery path, and a control module. The control module is used for controlling the first delivery path management module, the second delivery path management module, the third delivery path management module, the fourth delivery path management module, the fifth delivery path management module and the sixth delivery path management module.

In an exemplary embodiment, since there are a plurality of second delivery paths, third delivery paths and sixth delivery paths, the second delivery path management module, the third delivery path management module and the sixth delivery path management module further include a plurality of delivery path management units, and the number of the delivery path management units is equal to that of the delivery paths. For example, the number of the second delivery paths is equal to that of the chemiluminescence detectors. The number of the second delivery paths is N (N≥1, the N is the positive integer). At this moment, the second delivery path management module includes N second delivery management units, and the N second delivery management units are provided in one-to-one correspondence with the N second delivery paths. The second delivery path management module further controls the N second delivery management units. The number of the third delivery paths may be equal to that of the chemiluminescence detectors. The number of the third delivery paths is N (N≥1, the N is the positive integer). At this moment, the third delivery path management module includes N third delivery management units, and the N third delivery management units are provided in one-to-one correspondence with the N third delivery paths. The third delivery path management module further may control the N third delivery management units. There may be (N−1) sixth delivery paths. At this moment, the sixth delivery path management module includes (N−1) sixth delivery management units. (N−1) sixth delivery management units are provided in one-to-one correspondence with (N−1) sixth delivery paths. The sixth delivery path management module further may control the (N−1) sixth delivery management units.

Of course, in other embodiments, the medical detection device further may employ two sample bin mechanisms and two sample transfer mechanisms. At this moment, one sample bin mechanism is used as a sample supply bin and is only used for supplying the sample racks to the outside, and the other sample bin mechanism is used as a sample recycling bin and is only used for recycling the sample racks. One sample transfer mechanism is used as a supply transfer mechanism, and is provided between the sample supply bin and the first chemiluminescence detector. The other sample transfer mechanism is used as a recycling transfer mechanism, and is provided between the sample recycling bin and the last one chemiluminescence detector, as shown in FIG. 2. In some embodiments, the sample rack start-stop position 110 includes a sample rack initial position and a sample rack end position. Two transfer positions 211 are provided and each transfer positions 211 includes a supply transfer position and a recycling transfer position. In an exemplary embodiment, each transmission passage on the sample delivery apparatus is used for delivering the sample racks from the sample rack initial position to the sample rack end position, that is, the sample delivery apparatus is not provided with a recycling passage. In an exemplary embodiment, the sample racks in the sample supply bin and the sample recycling bin may be delivered one another.

When a plurality of chemiluminescence detectors are spliced in use, the multiple chemiluminescence detectors may share two sample bin mechanisms and two sample transfer mechanisms. The sample delivery mechanisms corresponding to each of the chemiluminescence detectors may be spliced together in use, and the splicing manner is the same as that in the above embodiment and can be referred to the above description. It may be understood that, in this embodiment, the sample initial position is a position of each of the sample racks in the sample supply bin, and the sample rack end position is a position of each of the sample racks in the sample recycling bin. A supply transfer position refers to a position where the supply transfer mechanism is located. The recycling transfer position refers to a position where the recycling transfer mechanism is located.

At this moment, through the position nodes on the medical detection device, the total movement path in the sample rack delivery process may be divided into a plurality of delivery paths. Wherein, the state of each of the position nodes may be an occupancy state or an available state. When the position node is in the occupancy state, it indicates that the sample rack is stayed at the position node. When the position node is in the available state, it indicates that the position node is in an idle state and is not occupied by any sample rack. In an exemplary embodiment, through the each of the position nodes, the total movement path of the sample rack may be divided into a seventh delivery path, an eighth delivery path, a ninth delivery path and a tenth delivery path. Wherein, the seventh delivery path may be the sample initial position to the sample adding buffer position or the emergency sample adding position or the recycling buffer position of a first target chemiluminescence detector; the eighth delivery path may be the sample adding buffer position to the conventional sample adding position of a same chemiluminescence detector; a plurality of eighth delivery paths may be provided and the number may be equal to that of the chemiluminescence detectors; the ninth delivery path may be the conventional sample adding position or the emergency sample adding position or the recycling buffer position of an $N^{th}$ chemiluminescence detector to the sample rack end position; the tenth delivery path may be the conventional sample adding position corresponding to an $i^{th}$ chemiluminescence detector to the sample adding buffer position or the emergency sample adding position or the recycling buffer position corresponding to a second target chemiluminescence detector, or the tenth delivery path is the emergency sample adding position corresponding to the $i^{th}$ chemiluminescence detector to the emergency sample adding position or the conventional sample adding position or the recycling buffer position corresponding to the second target chemiluminescence detector, or the tenth delivery path is the recycling buffer position corresponding to the $i^{th}$ chemiluminescence detector to the emergency sample adding position or the conventional sample adding position corresponding to the second target chemiluminescence detector. Wherein, there are N chemiluminescence detectors (N≥2, the N is the positive integer), 1≤i≤N and the i is the positive integer.

Figure 7:
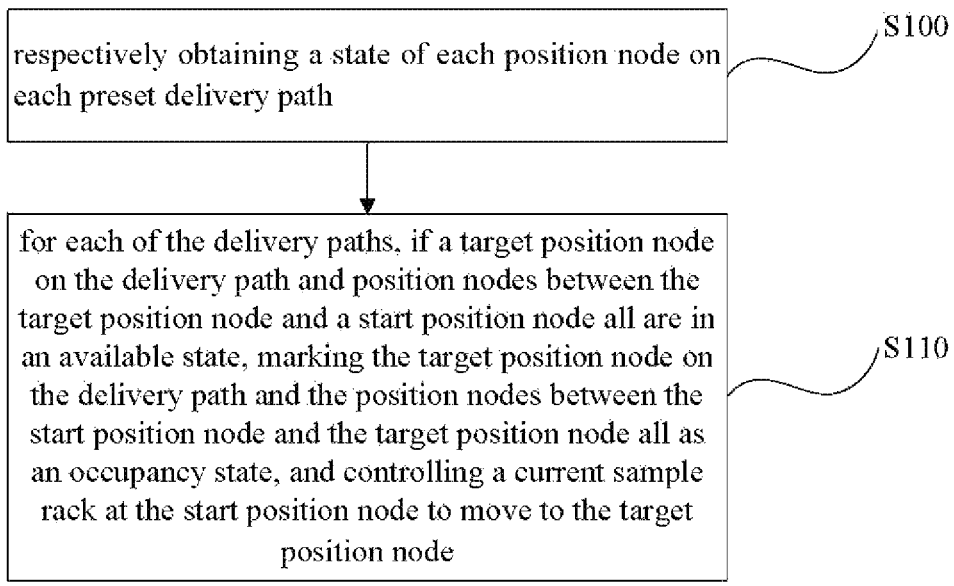
FIG. 7 is a flowchart of one embodiment of a sample rack scheduling control method of the preset disclosure.

As shown in FIG. 7, some embodiments of the present disclosure further provide a sample rack scheduling control method. The sample rack scheduling control method is used in the above medical detection device, wherein the medical detection device includes a sample bin mechanism and a sample transfer mechanism. The control method may implement automatic scheduling control of sample racks, thereby improving the detection efficiency of the device. In an exemplary embodiment, the above method includes the following steps.

In Step S100, a state of each position node on each preset delivery path is obtained, wherein the each position node is provided according to a total movement path of the sample racks, and the each position node includes a sample rack start-stop position, a transfer position, a sample adding buffer position, a sample adding position (including a conventional sample adding position and an emergency sample adding position), a rail changing position and a recycling buffer position. The states of the position nodes include an available state and an occupancy state, wherein the available state of each of the position nodes refers to that no sample rack is stayed on the position node, and the occupancy state of each of the position nodes refers to that the sample rack is stayed at the position node, and at this moment, the occupied position node cannot be used by other sample racks. In an exemplary embodiment, the above multiple position nodes can be formed into a plurality of preset delivery paths, and through the plurality of delivery paths, the sample racks may be delivered in parallel. In an exemplary embodiment, each of the delivery paths includes a path from the sample rack start-stop position to the sample adding buffer position, a path from the sample adding buffer position to the conventional sample adding position, a path from the sample adding position to the recycling buffer position, and a path from the recycling buffer position to the sample rack start-stop position.

In Step S110, for each of the delivery paths, if a target position node on the each of the delivery paths and position nodes between the target position node and a start position node all are in the available state, the target position node on the delivery path and the position nodes between the start position node and the target position node all are marked as the occupancy state, and a current sample rack at the start position node is controlled to move to the target position node, wherein the start position node is a first position node on the delivery path, an initial state of the start position node is in the occupancy state, and the target position node is a last one position node on the delivery path. In an exemplary embodiment, there may be one or more position nodes between the target position node and the start position node. Of course, there also may be no position node between the target position node and the start position node, that is, only two position nodes (the start position node and the target position node) are included on the delivery path. At this moment, as long as the target position node is in the available state, the sample racks at the start position node can be controlled to start movement.

In this embodiment, through providing a plurality of position nodes, the total movement path of the sample racks may be divided into a plurality of delivery paths. When the target position node on each delivery path and the position nodes between the target position node and the start position node all are in the available state, it indicates that the delivery path is unblocked; at this moment, each of the position nodes on the delivery path can be marked as the occupancy state, and the sample racks at the start position node on the delivery path are controlled to move to the target position node. In this way, as long as the delivery path is unblocked, the sample racks can be started to be delivered; and thus, the parallel delivery for a plurality of sample racks is implemented, there is no need to wait to deliver a next sample rack after a previous one is delivered completely, the utilization rate of each transmission passage on the sample delivery apparatus is improved, and the delivery efficiency of the sample racks is improved.

Figure 8:
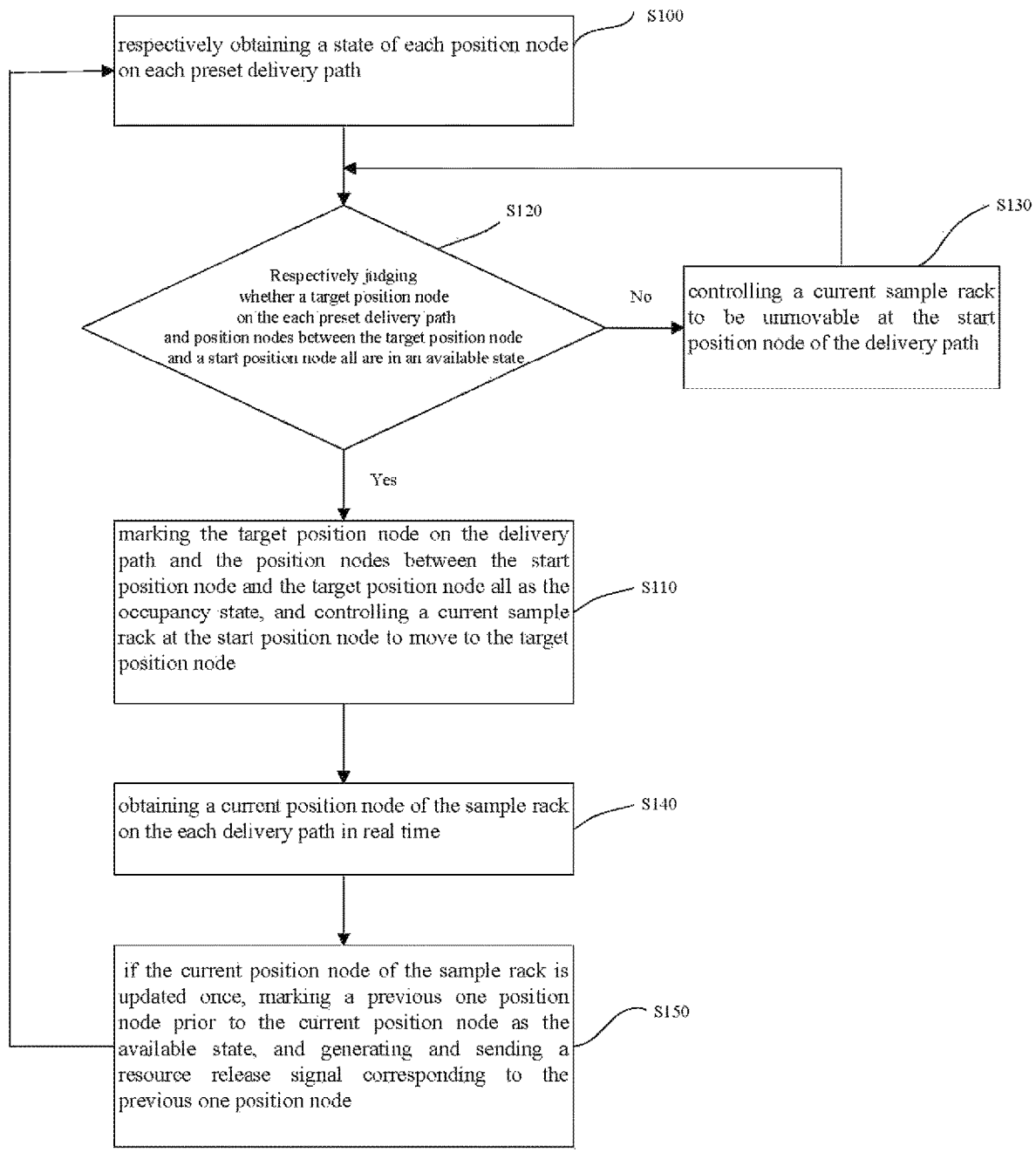
FIG. 8 is a flowchart of another embodiment of a sample rack scheduling control method of the preset disclosure.

In an exemplary embodiment, as shown in FIG. 8, before the step S110, the method further includes the following steps.

In Step S120, whether a target position node on the each delivery path and position nodes between the target position node and a start position node all are in the available state or not is judged respectively, and if yes, the step S110 is executed, the target position node on the delivery path and the position nodes between the start position node and the target position node all are marked as the occupancy state, and a current sample rack at the start position node is controlled to move to the target position node; and if no, when the target position node on the delivery path and/or the position nodes between the target position node and the start position node are in the occupancy state, the step S130 is executed, and the current sample rack is controlled to be unmovable at the start position node of the delivery path till the target position node on the delivery path and the position nodes between the target position node and the start position node all are in the available state.

In an exemplary embodiment, whenever the state of each of the position nodes is changed into the available state, the system may generate and send a resource release signal corresponding to the relevant position node, and may respectively judge whether the target position node and position nodes between the target position node and the start position node of the each delivery path are in the available state or not according to one or more resource release signals received at present. When the target position node on the delivery path and/or the position nodes between the target position node and the start position node are in the occupancy state, the system waits a resource release signal of the target position node and the resource release signals of the position nodes between the target position node and the start position node till the target position node on the delivery path and the position nodes between the target position node and the start position node all are in the available state.

In an exemplary embodiment, the above method further includes the following steps.

In Step S140, a current position node of the current sample rack on the each delivery path is obtained in real time; in an exemplary embodiment, the current position node on the sample rack is a start position node on the delivery node; and in a process when the current sample rack is moved from the start position node of the delivery path to the target position node, the current position node of the sample rack will be changed.

In Step S150, for each of the delivery paths, if the current position node of the current sample rack is updated once, a previous one position node prior to the current position node is marked as the available state, and a resource release signal corresponding to the previous one position node is generated and sent. In an exemplary embodiment, for each of the delivery paths, if the current position node of the current sample rack is updated once, it indicates that the sample rack has been moved to a next one position node on the delivery path. At this moment, the previous one position node prior to the current position node on the delivery path is marked as the available state, that is, through sending the resource release signal corresponding to the previous one position node prior to the current position node on the delivery path, the position node that the current sample rack has passed is released so as to be used conveniently by other sample racks on the delivery path. Compared with a control method that releases each of the position nodes after the sample racks are moved to the target position node, the sample rack scheduling control method in this embodiment further improves the sample rack delivery efficiency of the medical detection device.

Figure 9:
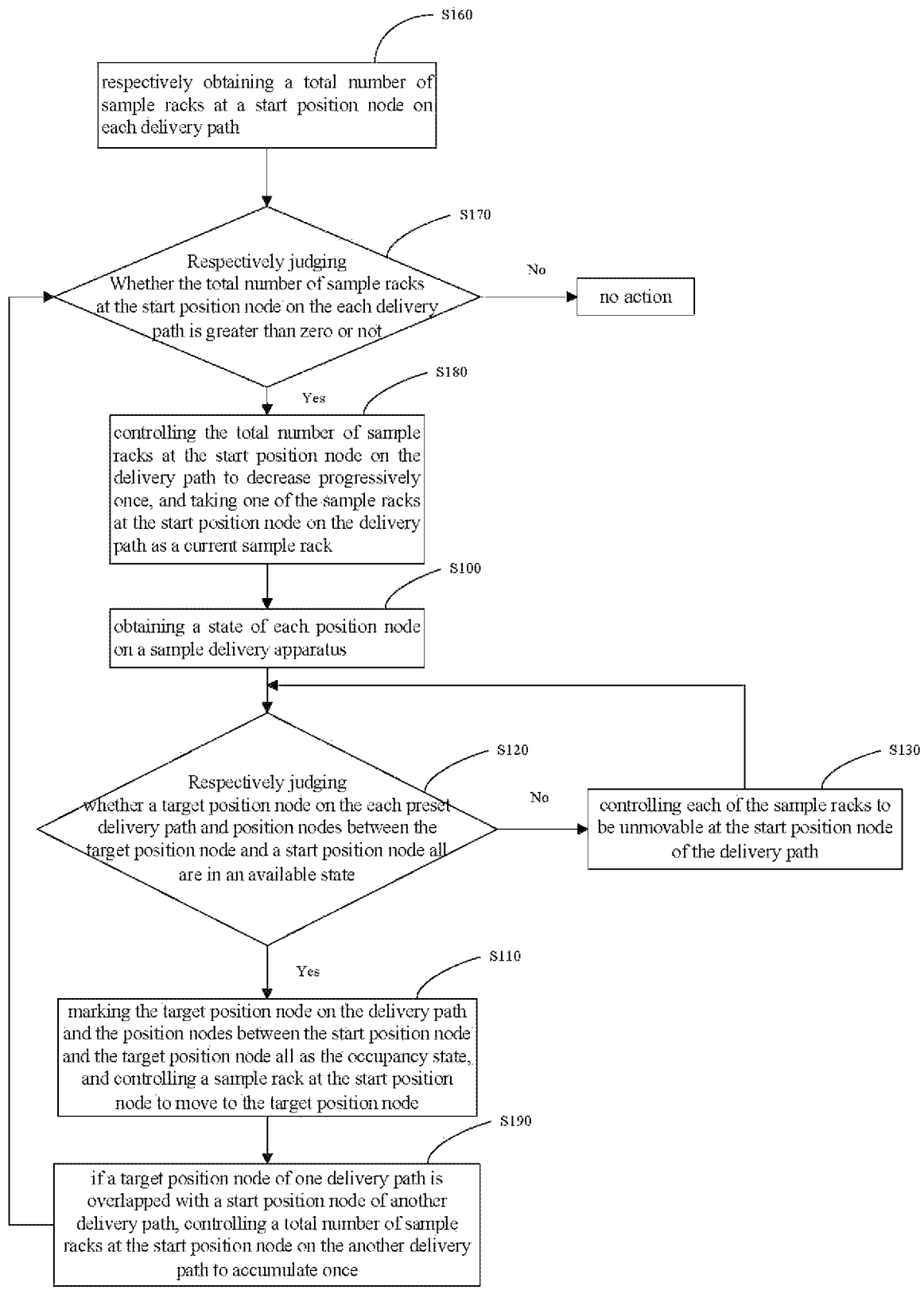
FIG. 9 is a flowchart of a still another embodiment of a sample rack scheduling control method of the preset disclosure.

In an exemplary embodiment, as shown in FIG. 9, before the step S110, the method further includes the following steps.

In Step S160, a total number of sample racks at the start position node on the each delivery path is respectively obtained; specifically, the total numbers of the sample racks at the start position nodes on different delivery paths are different. In an exemplary embodiment, the total number of sample racks at the start position node on the first delivery path may be equal to the number of sample racks for to-be-taken samples in the sample bin mechanism. The total number of sample racks at the start position node on each of the second delivery paths may be equal to the number of sample racks placed at the sample adding buffer position, and there may be one sample rack. The total number of sample racks at the start position node on each of the third delivery paths may be equal to a sum of the number of sample racks placed at the emergency sample adding position and the number of sample racks placed at the conventional sample adding position, that is, there may be two sample racks at the start position node of each of the third delivery paths. The total number of sample racks at the start position node of the fourth delivery path may be equal to the number of sample racks at a recycling buffer position of the first chemiluminescence detector, and there may be one sample rack. There is also one sample rack at the start position node on each of the fifth delivery paths and each of the sixth delivery paths.

In Step S170, whether the total number of sample racks at the start position node on the each of the delivery paths is greater than zero or not is respectively judged, and for the each of the delivery paths, if the total number of sample racks at the start position node on the delivery path is greater than zero, the step S180 is executed, the total number of sample racks at the start position node on the delivery path is controlled to decrease progressively once, and one of the sample racks at the start position node on the delivery path is taken as the current sample rack. In an exemplary embodiment, when the number of the sample rack at the start position node on the delivery path is zero, it indicates that no sample rack to be delivered is on the delivery path temporarily. In an exemplary embodiment, when the total number of sample racks at the start position node on the delivery path is greater than or equal to 1, more than one sample rack is sorted according to a "first-in first-out" sequence. First of all, the total number of sample racks at the start position on the delivery path is controlled to decrease progressively once; and according to the above preset sort sequence, a first sample rack is controlled to take as the current sample rack.

In Step S100, a state of each position node on each sample delivery apparatus is obtained, wherein the each position node is provided according to a total movement path of the sample racks, and the each position node includes a sample rack start-stop position, a transfer position, a sample adding buffer position, a sample adding position (including a conventional sample adding position and an emergency sample adding position), a rail changing position and a recycling buffer position. The state of each of the position nodes includes an available state and an occupancy state, wherein the available state of each of the position nodes refers to that no sample rack is stayed on the position node, and the occupancy state of each of the position nodes refers to that the sample rack is stayed at the position node, and at this moment, the occupied position node cannot be used by other sample racks. In an exemplary embodiment, the above position nodes can be formed into a plurality of preset delivery paths, and through the plurality of delivery paths, the sample racks may be delivered in parallel.

In Step S120, whether a target position node on the each delivery path and position nodes between the target position node and a start position node of the each delivery path all are in the available state or not is judged respectively, and if yes, the step S110 is executed, the target position node on the delivery path and the position nodes between the start position node and the target position node all are marked as the occupancy state, and a current sample rack at the start position node is controlled to move to the target position node; and if no, when the target position node on the delivery path and/or the position nodes between the target position node and the start position node are in the occupancy state, the step S130 is executed, and the current sample rack is controlled to be unmovable at the start position node of the delivery path till the target position node on the delivery path and the position nodes between the target position node and the start position node all are in the available state.

In one embodiment, the medical detection device includes one or more chemiluminescence detectors. Each chemiluminescence detector is correspondingly provided with a sample rack start-stop position, a transfer position, a sample adding buffer position, a conventional sample adding position, an emergency sample adding position, a rail changing position and a recycling buffer position. In an exemplary embodiment, when the medical detection device is spliced by a plurality of chemiluminescence detectors together, the plurality of chemiluminescence detectors may share one sample rack start-stop position and one transfer position, that is, the plurality of chemiluminescence detectors may share the sample rack start-stop position and the transfer position corresponding to a first chemiluminescence detector. The first chemiluminescence detector refers to a chemiluminescence detector connected with the sample bin mechanism.

In an exemplary embodiment, when the medical detection device is formed by splicing the plurality of chemiluminescence detectors, each of the delivery paths includes a first delivery path, a second delivery path, a third delivery path, a fourth delivery path, a fifth delivery path and a sixth delivery path. Wherein, a start position node of the first delivery path is the sample rack start-stop position, a target position node is the sample adding buffer position or the emergency sample adding position provided on a first target chemiluminescence detector, and position nodes between the start position node and the target position node include the transfer position. Wherein, the first target chemiluminescence detector may be the first chemiluminescence detector or an $i^{th}$ ($1 \leq i \leq N$, the i is a positive integer) chemiluminescence detector.

When the first target chemiluminescence detector is the first chemiluminescence detector, the transfer position is provided between the start position node and the target position node. In an exemplary embodiment, when an emergency sample on a sample rack at the sample rack start-stop position (namely, a sample rack in the sample bin mechanism) needs to be delivered to the emergency sample adding position of the first chemiluminescence detector, whether the transfer position and the emergency sample adding position of the first chemiluminescence detector all are in the available state or not is judged according to the state of each of the position nodes on the first delivery path, that is, whether a resource release signal corresponding to the transfer position and a resource release signal corresponding to the sample adding buffer position of the first chemiluminescence detector are received or not is judged. If the transfer position and the emergency sample adding position of the first chemiluminescence detector all are in the available state, the total number of sample racks at the start position node on the first delivery path in a first delivery path management module may be first decreased progressively once, and a current sample rack that needs to be delivered at present is determined. Meanwhile, the transfer position and the emergency sample adding position of the first chemiluminescence detector are marked as the occupancy state, and the current sample rack is controlled to transfer from the sample start-stop position to the emergency sample adding position of the first chemiluminescence detector.

In an exemplary embodiment, when the current sample rack is moved from the sample start-stop position to the transfer position, the sample rack start-stop position may be marked as the available state, a resource release signal corresponding to the sample rack start-stop position is released, and a next one sample rack is controlled to move to the sample rack start-stop position. When the current sample rack is moved from the transfer position to the emergency sample adding position of the first chemiluminescence detector, the transfer position may be controlled to mark as the available state and a resource release signal corresponding to the transfer position is released, so that the sample transfer mechanism may be used by other sample racks. If the transfer position and/or the emergency sample adding position of the first chemiluminescence detector are in the occupancy state, the current sample rack is controlled to be unmovable at the current sample rack start-stop position.

When a conventional sample on a sample rack at the sample rack start-stop position (a sample rack in the sample bin mechanism) needs to be delivered to the sample adding buffer position of the first chemiluminescence detector, the total number of sample racks at the start position node on the first delivery path in the first delivery path management module may be first decreased progressively once, and a current sample rack that needs to be delivered at present is determined. Then, whether the transfer position and the sample adding position of the first chemiluminescence detector all are in the available state or not is judged according to the state of each of the position nodes on the first delivery path, that is, whether a resource release signal corresponding to the transfer position and a resource release signal corresponding to the sample adding buffer position of the first chemiluminescence detector are received or not is judged.

If the transfer position and the sample adding buffer position of the first chemiluminescence detector all are in the available state, the transfer position and the sample adding buffer position of the first chemiluminescence detector may be marked as the occupancy state, and the current sample rack is controlled to transfer from the sample start-stop position to the sample adding buffer position. In an exemplary embodiment, when the current sample rack is moved from the sample start-stop position to the transfer position, the sample rack start-stop position may be marked as the available state, a resource release signal corresponding to the sample rack start-stop position is released, and a next one sample rack is controlled to move to the sample rack start-stop position. When the sample rack is moved from the transfer position to the sample adding buffer position of the first chemiluminescence detector, the transfer position may be controlled to mark as the available state and a resource release signal corresponding to the transfer position is released, so that the sample transfer mechanism may be used by other sample racks.

If the transfer position and/or the sample adding buffer position of the first chemiluminescence detector are in the occupancy state, the current sample rack is controlled to be unmovable at the current sample rack start-stop position; and then, according to the state of each of the position nodes on the first delivery path, whether the transfer position and the sample adding buffer position of the first chemiluminescence detector all are in the available state or not is judged, and till the transfer position and the sample adding buffer position of the first chemiluminescence detector are in the available state, the current sample rack is controlled to move from a current position to the sample adding buffer position of the first chemiluminescence detector. The above cycle is repeated till there is no sample rack that can be delivered at the start position node on the first delivery path.

In an exemplary embodiment, when the first target chemiluminescence detector is the $i^{th}$ chemiluminescence detector, the position nodes between the start position node and the target position node include the transfer position, corresponding i–1 emergency sample adding positions of previous i–1 chemiluminescence detectors and corresponding i–1 rail changing positions of the previous i–1 chemiluminescence detectors.

In an exemplary embodiment, when an emergency sample on a sample rack at the sample rack start-stop position (namely, a sample rack in the sample bin mechanism) needs to be delivered to an emergency sample adding position of the $i^{th}$ chemiluminescence detector, whether the transfer position, emergency sample adding positions of previous i chemiluminescence detectors and rail changing positions of previous i–1 chemiluminescence detectors all are in the available state or not is judged according to the state of each of the position nodes on the first delivery path, that is, whether a resource release signal corresponding to the transfer position, resource release signals corresponding to the sample adding buffer positions of the previous i chemiluminescence detectors and resource release signals corresponding to the rail changing positions of the previous i–1 chemiluminescence detectors are received or not is judged. If the transfer position, the emergency sample adding positions of the previous i chemiluminescence detectors and the rail changing positions of the previous i–1 chemiluminescence detectors all are in the available state, the total number of sample racks at the start position node on the first delivery path in the first delivery path management module is first decreased progressively once, and a current sample rack that needs to be delivered at present is determined. Meanwhile, the transfer position, the emergency sample adding positions of the previous i chemiluminescence detectors and the rail changing positions of the previous i–1 chemiluminescence detectors are marked as the occupancy state, and the sample rack is controlled to transfer from the sample start-stop position to the emergency sample adding position of the $i^{th}$ chemiluminescence detector.

In an exemplary embodiment, when the current sample rack is moved from the sample start-stop position to the transfer position, the sample rack start-stop position may be marked as the available state, a resource release signal corresponding to the sample rack start-stop position is released, and a next one sample rack is controlled to move to the sample rack start-stop position. When the current sample rack is moved from the transfer position to the emergency sample adding position of the first chemiluminescence detector, the transfer position may be controlled to mark as the available state and a resource release signal corresponding to the transfer position is released, so that the sample transfer mechanism may be used by other sample racks. When the current sample rack is moved from the transfer position to an emergency sample adding position of the $i^{th}$ chemiluminescence detector, a corresponding emergency sample adding position of an $(i-1)^{th}$ chemiluminescence detector may be controlled to mark as the available state, and a resource release signal corresponding to the emergency sample adding position of the $(i-1)^{th}$ chemiluminescence detector is released so that the emergency sample adding position may be used by other sample racks.

If the transfer position, and/or at least one of the emergency sample adding positions of the i chemiluminescence detectors, and/or at least one of the rail changing positions of the previous i−1 chemiluminescence detectors are in the occupancy state, the sample rack is controlled to be unmovable at the current sample rack start-stop position.

In an exemplary embodiment, when an emergency sample on a sample rack at the sample rack start-stop position (namely, a sample rack in the sample bin mechanism) needs to be delivered to a sample adding buffer position of the $i^{th}$ chemiluminescence detector, whether the transfer position, emergency sample adding positions of previous i−1 chemiluminescence detectors, rail changing positions of previous i−1 chemiluminescence detectors and the sample adding buffer position of the $i^{th}$ chemiluminescence detector all are in the available state or not is judged according to the state of each of the position nodes on the first delivery path, that is, whether a resource release signal corresponding to the transfer position, resource release signals corresponding to the emergency sample adding positions of the previous i−1 chemiluminescence detectors, resource release signals corresponding to the rail changing positions of the previous i−1 chemiluminescence detectors and a resource release signal corresponding to the sample adding buffer position of the $i^{th}$ chemiluminescence detector are received or not is judged. If the transfer position, the emergency sample adding positions of the previous i−1 chemiluminescence detectors, the rail changing positions of the previous i−1 chemiluminescence detectors and the sample adding buffer position of the $i^{th}$ chemiluminescence detector all are in the available state, the total number of sample racks at the start position node on the first delivery path in the first delivery path management module may be first decreased progressively once, and a current sample rack that needs to be delivered at present is determined. Meanwhile, the transfer position, the emergency sample adding positions of the previous i−1 chemiluminescence detectors, the rail changing positions of the previous i−1 chemiluminescence detectors and the sample adding buffer position of the $i^{th}$ chemiluminescence detector may be marked as the occupancy state, and the sample rack is controlled to transfer from the sample start-stop position to the sample adding buffer position of the $i^{th}$ chemiluminescence detector.

If the transfer position, and/or at least one of the emergency sample adding positions of the previous i−1 chemiluminescence detectors, and/or at least one of the rail changing positions of the previous i−1 chemiluminescence detectors, and/or the sample adding buffer position of the $i^{th}$ chemiluminescence detector are in the occupancy state, the sample rack is controlled to be unmovable at the current sample rack start-stop position.

In an exemplary embodiment, a start position node of the second delivery path may be the sample adding buffer position, and a target position node of the second delivery path may be the conventional sample adding position located on a same detection instrument with the sample adding buffer position. In an exemplary embodiment, there are a plurality of second delivery paths. The number of the second delivery paths is equal to the number of the chemiluminescence detectors, that is, each chemiluminescence detector may be correspondingly provided with one second delivery path. At this moment, when a sample rack at the sample adding position needs to be delivered to a conventional sample adding position on the same chemiluminescence detector and a sampling operation is executed, the control system judges whether the conventional sample adding position is in the available state or not, that is, to judge whether a resource release signal corresponding to the conventional sample adding position is received or not. If the conventional sample adding position is in the available state, that is, the resource release signal corresponding to the conventional sample adding position is received, whether the start position node of the second delivery path has a sample rack in need of being delivered or not may be judged; and if the start position node of the second delivery path has the sample rack in need of being delivered, the total number of sample racks at the start position node of the second delivery path is controlled to decrease progressively once, and the sample rack need to be delivered at present is taken as the current sample rack. And meanwhile, the conventional sample adding position can be marked as the occupancy state, and the current sample rack is controlled to transfer from the sample adding buffer position to the conventional sample adding position. In an exemplary embodiment, after the current sample rack is moved to the conventional sample adding position, the sample adding buffer position may be marked as the available state, that is, a resource release signal corresponding to the sample adding buffer position is sent.

If the conventional sample adding position is in the occupancy state, the current sample rack is controlled to be unmovable at the sample adding buffer position, whether the conventional sample adding position is in the available state or not is continuously judged, and till the conventional sample adding position is in the available state, the current sample rack is conveyed to the conventional sample adding position. The above cycle is repeated till there is no sample rack that can be delivered at the start position node of the second delivery path.

In an exemplary embodiment, a start position node of the third delivery path may be the conventional sample adding position or the emergency sample adding position, a target position node of the third delivery path may be the recycling buffer position located on a same chemiluminescence detector with the conventional sample adding position or the emergency sample adding position, and position nodes between the start position node and the target position node include the rail changing position located on a same chemiluminescence detector with the conventional sample adding position or the emergency sample adding position. In an exemplary embodiment, there are a plurality of third delivery paths. The number of the third delivery paths is equal to the number of the chemiluminescence detectors, that is, each chemiluminescence detector may be correspondingly provided with one third delivery path. At this moment, when a sample rack at the sample adding position (conventional sample adding position or emergency sample adding position) needs to be delivered to the recycling buffer position, the control system may judge whether the rail changing position and the recycling buffer position both are in the available state or not, that is, the control system judges whether a resource release signal corresponding to the rail changing position and a resource release signal corresponding to the recycling buffer position are received or not. If the rail changing position and the recycling buffer position both are in the available state and the start position node of the third delivery path has the sample rack in need of being delivered, the total number of sample racks at the start position node of the third delivery path is controlled to decrease progressively once, and the sample rack (such as a first sample rack in a queue) in need of being delivered at present is taken as a current sample rack. And meanwhile, the rail changing position and the recycling buffer position both may be marked as the occupancy state, and the current sample rack is controlled to transfer from the sample adding position to the recycling buffer position. In an exemplary embodiment, after the current sample rack is moved from the sample adding position to the rail changing position, the sample adding position may be marked as the available state, that is, a resource release signal corresponding to the sample adding position is sent; and after the current sample rack is moved from the rail changing position to the recycling buffer position, the rail changing position may be marked as the available state, that is, a resource release signal corresponding to the rail changing position may be sent.

If the rail changing position and/or the recycling buffer position are in the occupancy state, the current sample rack is controlled to be unmovable at the sample adding position, whether the rail changing position and the recycling buffer position are in the available state is continuously judged, and till the rail changing position and the recycling buffer position are in the available state, the current sample rack may be conveyed to the recycling buffer position. The above cycle is repeated till there is no sample rack that can be delivered at the start position node of the third delivery path.

In an exemplary embodiment, a start position node of the fourth delivery path may be the recycling buffer position on the first chemiluminescence detector connected with a transfer unit, a target position node of the fourth delivery path may be the sample rack start-stop position, and position nodes between the start position node and the target position node include the transfer position. At this moment, when a sample rack at the recycling buffer position needs to be delivered to the sample rack start-stop position, the control system judges whether the transfer position and the sample start-stop position both are in the available state or not, that is, the control system judges whether a resource release signal corresponding to the transfer position and a resource release signal corresponding to the sample start-stop position are received or not. If the transfer position and the sample rack start-stop position both are in the available state and the start position node of the fourth delivery path has the sample rack in need of being delivered, the total number of sample racks at the start position node of the fourth delivery path is controlled to decrease progressively once, and a current sample rack is determined. And meanwhile, the transfer position may be marked as the occupancy state, and the current sample rack is controlled to transfer from the recycling buffer position to the sample rack start-stop position. In an exemplary embodiment, after the current sample rack is moved to the sample rack start-stop position, the transfer position is marked as the available state.

If the transfer position and/or the sample start-stop position are in the occupancy state, the current sample rack is controlled to be unmovable, whether the transfer position and the sample start-stop position are in the available state or not is continuously judged, and till the transfer position and the sample start-stop position are in the available state, the current sample rack may be conveyed to the sample start-stop position. The above cycle is repeated till there is no sample rack that can be delivered at the start position node of the fourth delivery path.

In an exemplary embodiment, a start position node of the fifth delivery path may be a conventional sample adding position on an $i^{th}$ chemiluminescence detector, and a target position node of the fifth delivery path is a sample adding buffer position or an emergency sample adding position on a second target chemiluminescence detector, or the start position node of the fifth delivery path is an emergency sample adding position on the $i^{th}$ chemiluminescence detector, and the target position node of the fifth delivery path is an emergency sample adding position on the second target chemiluminescence detector. Wherein, the second target chemiluminescence detector may be an $(i+n)^{th}$ chemiluminescence detector or an $N^{th}$ chemiluminescence detector, wherein $i<i+n \leq N$, $n \geq 1$ and the n is a positive integer. Position nodes between the start position node and the target position node include rail changing positions of n chemiluminescence detectors.

In an exemplary embodiment, if the second target chemiluminescence detector is the $(i+n)^{th}$ chemiluminescence detector, and at this moment, if a sample rack at a conventional sample adding position of the $i^{th}$ chemiluminescence detector needs to be delivered to a sample adding buffer position of the $(i+n)^{th}$ chemiluminescence detector, the control system may first judge whether the rail changing positions of the n chemiluminescence detectors, n conventional sample adding positions of the n chemiluminescence detectors, sample adding buffer positions of the n chemiluminescence detectors, and the sample adding buffer position of the $(i+n)^{th}$ chemiluminescence detector all are in the available state or not, that is, the control system may first judge whether resource release signals corresponding to the n rail changing positions of the n chemiluminescence detectors, resource release signals corresponding to the n conventional sample adding positions of the n chemiluminescence detectors, resource release signals corresponding to the sample adding buffer positions of the n chemiluminescence detectors, and a resource release signal corresponding to the sample adding buffer position of the $(i+n)^{th}$ chemiluminescence detector are received or not. If the n rail changing positions of the n chemiluminescence detectors, the conventional sample adding positions of the n chemiluminescence detectors, the sample adding buffer positions of the n chemiluminescence detectors, and the sample adding buffer position of the $(i+n)^{th}$ chemiluminescence detector all are in the available state, and the conventional sample adding position of the $i^{th}$ chemiluminescence detector has a sample rack in need of being delivered, the total number of sample racks at the conventional sample adding position of the $i^{th}$ chemiluminescence detector is controlled to decrease progressively once, and a current sample rack in need of being delivered at present is determined. And meanwhile, the n rail changing positions of the n chemiluminescence detectors, the conventional sample adding positions of the n chemiluminescence detectors, the sample adding buffer positions of the n chemiluminescence detectors, and the sample adding buffer position of the $(i+n)^{th}$ chemiluminescence detector all are marked as the occupancy state, and the current sample rack is controlled to transfer from the conventional sample adding position of the $i^{th}$ chemiluminescence detector to the sample adding buffer position of the $(i+n)^{th}$ chemiluminescence detector.

In an exemplary embodiment, after the current sample rack is moved to the rail changing position of the $i^{th}$ chemiluminescence detector, the conventional sample adding position of the $i^{th}$ chemiluminescence detector may be marked as the available state, that is, a resource release signal corresponding to the conventional sample adding position of the $i^{th}$ chemiluminescence detector is sent. When the sample rack is moved to the sample adding buffer position of the $(i+1)^{th}$ chemiluminescence detector, the rail changing position of the $i^{th}$ chemiluminescence detector may be marked as the available state, that is, a resource release signal corresponding to the rail changing position of the $i^{th}$ chemiluminescence detector may be sent.

If at least one of the n rail changing positions of the n chemiluminescence detectors, and/or any one of the conventional sample adding positions of the n chemiluminescence detectors, and/or any one of the sample adding buffer positions of the n chemiluminescence detectors, and/or the sample adding buffer position of the $(i+n)^{th}$ chemiluminescence detector are in the occupancy state, the current sample rack is controlled to be unmovable at the conventional sample adding position of the $i^{th}$ chemiluminescence detector, then whether the n rail changing positions of the n chemiluminescence detectors, the conventional sample adding positions of the n chemiluminescence detectors, the sample adding buffer positions of the n chemiluminescence detectors and the sample adding buffer position of the $(i+n)^{th}$ chemiluminescence detector are in the available state or not is judged continuously, and if the n rail changing positions of the n chemiluminescence detectors and the sample adding buffer position of the $(i+n)^{th}$ chemiluminescence detector all are in the available state, then the current sample rack is conveyed to the sample adding buffer position of the $(i+n)^{th}$ chemiluminescence detector. The above cycle is repeated till there is no sample rack that can be delivered at the start position node of the fifth delivery path.

If a sample rack at an emergency sample adding position of the $i^{th}$ chemiluminescence detector needs to be delivered to an emergency sample adding position of the $(i+n)^{th}$ chemiluminescence detector, the control system may first judge whether the n rail changing positions of the n chemiluminescence detectors, n emergency sample adding positions of the n chemiluminescence detectors and the emergency sample adding position of the $(i+n)^{th}$ chemiluminescence detector all are in the available state or not, that is, the control system may judge whether resource release signals corresponding to the n rail changing positions of the n chemiluminescence detectors, resource release signals corresponding to the n emergency sample adding positions of the n chemiluminescence detectors and a resource release signal corresponding to the emergency sample adding position of the $(i+n)^{th}$ chemiluminescence detector are received or not. If n rail changing positions of the $i^{th}$ chemiluminescence detector, the n emergency sample adding positions of the n chemiluminescence detectors and the emergency sample adding position of the $(i+n)^{th}$ chemiluminescence detector all are in the available state, and the emergency sample adding position of the $i^{th}$ chemiluminescence detector has a sample rack in need of being delivered, the total number of sample racks at the emergency sample adding position of the $i^{th}$ chemiluminescence detector is controlled to decrease progressively once, and a current sample rack in need of being delivered at present is determined. And meanwhile, the n rail changing positions of the n chemiluminescence detectors, the n emergency sample adding positions of the n chemiluminescence detectors and the emergency sample adding position of the $(i+n)^{th}$ chemiluminescence detector all may be marked as the occupancy state, and the current sample rack is controlled to transfer from the emergency sample adding position of the $i^{th}$ chemiluminescence detector to the emergency sample adding position of the $(i+n)^{th}$ chemiluminescence detector.

In an exemplary embodiment, after the sample rack is moved to the rail changing position of the $i^{th}$ chemiluminescence detector, the emergency sample adding position of the $i^{th}$ chemiluminescence detector may be marked as the available state, that is, a resource release signal corresponding to the emergency sample adding position of the $i^1$ chemiluminescence detector is sent. When the sample rack is moved to the emergency sample adding position of the $(i+1)^{th}$ chemiluminescence detector, the rail changing position of the $i^{th}$ chemiluminescence detector may be marked as the available state, that is, a resource release signal corresponding to the rail changing position of the $i^{th}$ chemiluminescence detector is sent.

If any one of the n rail changing positions of the n chemiluminescence detectors, and/or any one of the n emergency sample adding positions of the n chemiluminescence detectors, and/or the emergency sample adding position of the $(i+n)^{th}$ chemiluminescence detector are in the occupancy state, the sample rack is controlled to be unmovable at the emergency sample adding position of the $i^{th}$ chemiluminescence detector, then whether the n rail changing positions of the n chemiluminescence detectors and the emergency sample adding position of the $(i+n)^{th}$ chemiluminescence detector all are in the available state or not is judged continuously, and if the n rail changing positions of the n chemiluminescence detectors, the n emergency sample adding positions of the n chemiluminescence detectors and the emergency sample adding position of the $(i+n)^{th}$ chemiluminescence detector all are in the available state, then the current sample rack is conveyed to the emergency sample adding position of the $(i+n)^{th}$ chemiluminescence detector. The above cycle is repeated till there is no sample rack that can be delivered at the start position node of the fifth delivery path.

In an exemplary embodiment, the emergency sample adding positions corresponding to the n chemiluminescence detectors of the medical detection device on a sample conveying mechanism are taken as "overspeed" passages for the conventional sample. At this moment, if a sample rack at the emergency sample adding position of the $i^{th}$ chemiluminescence detector needs to be delivered to the sample adding buffer position of the $(i+n)^{th}$ chemiluminescence detector, the control system may first judge whether the n rail changing positions of the n chemiluminescence detectors, n emergency sample adding positions of the n chemiluminescence detectors and the sample adding buffer position of the $(i+n)^{th}$ chemiluminescence detector all are in the available state or not, that is, the control system may first judge whether a resource release signal corresponding to the rail changing position of the $i^{th}$ chemiluminescence detector, resource release signals corresponding to the n emergency sample adding positions of the n chemiluminescence detectors and a resource release signal corresponding to the sample adding buffer position of the $(i+n)^{th}$ chemiluminescence detector are received or not. If n rail changing positions of the n chemiluminescence detectors, the n emergency sample adding positions of the n chemiluminescence detectors and the sample adding buffer position of the $(i+n)^{th}$ chemiluminescence detector all are in the available state, and the emergency sample adding position of the $i^{th}$ chemiluminescence detector has a sample rack in need of being delivered, the total number of sample racks at the emergency sample adding position of the $i^{th}$ chemiluminescence detector is controlled to decrease progressively once, and a current sample rack in need of being delivered at present is determined. And meanwhile, the n rail changing positions of the $i^{th}$ chemiluminescence detector, the n emergency sample adding positions of the n chemiluminescence detectors and the sample adding buffer position of the $(i+n)^{th}$ chemiluminescence detector all may be marked as the occupancy state, and the current sample rack is controlled to transfer from the emergency sample adding position of the $i^{th}$ chemiluminescence detector to the sample adding buffer position of the $(i+n)^{th}$ chemiluminescence detector.

If the n rail changing positions of the n chemiluminescence detectors, the n emergency sample adding positions of the n chemiluminescence detectors, and/or the sample adding buffer position of the $(i+n)^{th}$ chemiluminescence detector are in the occupancy state, the current sample rack is controlled to be unmovable at the emergency sample adding position of the $i^{th}$ chemiluminescence detector, then whether the n rail changing positions of the n chemiluminescence detectors, the n emergency sample adding positions of the n chemiluminescence detectors and the sample adding buffer position of the $(i+n)^{th}$ chemiluminescence detector all are in the available state or not is judged continuously, and if the n rail changing positions of the n chemiluminescence detectors, the n emergency sample adding positions of the n chemiluminescence detectors and the sample adding buffer position of the $(i+n)^{th}$ chemiluminescence detector all are in the available state, then the current sample rack is conveyed to the sample adding buffer position of the $(i+n)^{th}$ chemiluminescence detector. The above cycle is repeated till there is no sample rack that can be delivered at the start position node of the fifth delivery path.

In an exemplary embodiment, a start position node of the sixth delivery path is the recycling buffer position on an $(i+1)^{th}$ chemiluminescence detector, a target position node of the sixth delivery path is a corresponding recycling buffer position of the $i^{th}$ chemiluminescence detector, and position nodes between the start position node and the target position node include a rail changing position of the $i^{th}$ chemiluminescence detector. In an exemplary embodiment, there may be a plurality of sixth delivery paths and the specific number may be equal to a number of the chemiluminescence detector subtracting one. In some embodiments, if a sample rack at the recycling buffer position of the (i+1) chemiluminescence detector needs to be delivered to the recycling buffer position of the $i^{th}$ chemiluminescence detector, the control system may first judge whether the rail changing position of the $i^{th}$ chemiluminescence detector and the recycling buffer position of the $i^{th}$ chemiluminescence detector both are in the available state or not, that is, the control system may judge whether a resource release signal corresponding to the rail changing position of the $i^{th}$ chemiluminescence detector and a resource release signal corresponding to the recycling buffer position of the $i^{th}$ chemiluminescence detector are received or not. If the rail changing position of the $i^{th}$ chemiluminescence detector and the recycling buffer position of the $i^{th}$ chemiluminescence detector both are in the available state, and the total number of sample racks at the start position node of the sixth delivery path is greater than zero, the total number of sample racks at the start position node of the sixth delivery path is controlled to decrease progressively once, and a current sample rack in need of being delivered is determined. And meanwhile, the rail changing position of the $i^{th}$ chemiluminescence detector and the recycling buffer position of the $i^{th}$ chemiluminescence detector may be marked as the occupancy state, and the current sample rack is controlled to transfer from the recycling buffer position on the $(i+1)^{th}$ chemiluminescence detector to the corresponding recycling buffer position of the $i^{th}$ chemiluminescence detector.

In an exemplary embodiment, after the current sample rack is moved to the rail changing position of the $i^{th}$ chemiluminescence detector, the recycling buffer position of the $(i+1)^{th}$ chemiluminescence detector may be marked as the available state, that is, a resource release signal corresponding to the recycling buffer position of the $(i+1)^{th}$ chemiluminescence detector is sent. When the current sample rack is moved to the recycling buffer position of the $i^{th}$ chemiluminescence detector, the rail changing position of the $i^{th}$ chemiluminescence detector may be marked as the available state, that is, a resource release signal corresponding to the rail changing position of the $i^{th}$ chemiluminescence detector is sent.

If the rail changing position of the $i^{th}$ chemiluminescence detector, and/or the recycling buffer position of the $i^{th}$ chemiluminescence detector are in the occupancy state, the sample rack is controlled to be unmovable at the recycling buffer position of the $(i+1)^{th}$ chemiluminescence detector, then whether the rail changing position of the $i^{th}$ chemiluminescence detector, and/or the recycling buffer position of the $i^{th}$ chemiluminescence detector are in the occupancy state or not is judged continuously, and till the rail changing position of the $i^{th}$ chemiluminescence detector and the recycling buffer position of the $i^{th}$ chemiluminescence detector are in the available state, then the current sample rack is conveyed to the recycling buffer position of the $i^{th}$ chemiluminescence detector. The above cycle is repeated till there is no sample rack that can be delivered at the start position node of the sixth delivery path.

In an exemplary embodiment, as shown in FIG. 9, the method includes the following steps.

In Step S190, if a target position node of one delivery path is overlapped with a start position node of another delivery path, when sample racks on the one delivery path are moved to the corresponding target position node, a total number of sample racks at the start position node of another delivery path is controlled to accumulate once. In some embodiments, when a target position node of sample racks on one delivery path is the conventional sample adding position or the emergency sample adding position, a total number of sample racks at a start position node on another delivery path is controlled to accumulate once after a preset time is waited. Wherein, the preset time may be a time required by the sample adding mechanism to finish a sample adding operation once. That is, when a target position node of sample racks on one delivery path is the conventional sample adding position or the emergency sample adding position, a total number of sample racks at a start position node of another delivery path is controlled to accumulate once after the current sample rack is waited to finish a sample adding operation.

For example, if the delivery path is the first delivery path, when a current sample rack at the sample start-stop position is moved to the sample adding buffer position, since the sample adding buffer position is the start position node of the second delivery path, the number of samples at the start position node of the second delivery path is accumulated once. In some embodiments, by controlling the total number of sample racks, provided corresponding to the chemiluminescence detectors, of the second delivery path management unit in the second delivery path management module to accumulate once, so that the number of the samples at the start position node of the second delivery path is accumulated once.

Also for example, if the delivery path is the third delivery path, when sample racks are moved from the sample adding position (conventional sample adding position or emergency sample adding position) to the recycling buffer position of a same chemiluminescence detector, since the recycling buffer position is the start position node of the fourth delivery path or the sixth delivery path, the total number of sample racks at the start position node on the fourth delivery path or the sixth delivery path is accumulated once after the sample racks are moved to the recycling buffer position. Specifically, the control process that the total number of sample racks at the start position node of the fourth delivery path or the sixth delivery path is accumulated once is implemented by controlling the number of sample racks in the fourth delivery path management module or the sixth delivery path management module to accumulate once.

Also for example, when the delivery path is the fourth delivery path, after the sample racks are moved from the recycling buffer position of the first chemiluminescence detector to the sample rack start-stop position, since the sample rack start-stop position is the start position node of the first delivery path, the total number of sample racks at the start position node of the first delivery path may be controlled to accumulate once after the sample racks are moved to the sample rack start-stop position. In some embodiments, the control process that the total number of sample racks at the start position node of the first delivery path is accumulated once can be implemented by controlling the number of sample racks in the first delivery path management module to accumulate once.

In an exemplary embodiment, when the method is used in a device including a plurality of chemiluminescence detectors, the method includes the following step.

For each chemiluminescence detector, when each of the sample racks is moved to the emergency sample adding position or the conventional sample adding position, the sample adding mechanism of the each chemiluminescence detector is controlled to suck up a sample. In some embodiments, the control system includes a control module. When each of the sample racks is moved to the emergency sample adding position, a corresponding delivery path management unit of the first delivery path sends a signal to the control module and the control module controls the sample adding mechanism to rotate to the emergency sample adding position to add the sample. When each of the sample racks is moved to the conventional sample adding position, a corresponding delivery path management unit of the second delivery path sends a signal to the control module and the control module controls the sample adding mechanism to rotate to the conventional sample adding position to add the sample.

In other embodiment, the sample rack scheduling method in one embodiment of the present disclosure is used in the above medical detection device, wherein the medical detection device may include two sample bin mechanisms and two sample transfer mechanisms, and the specific structural characteristics may be referred to the foregoing description. At this moment, through each of the position nodes on the medical detection device, the total movement path in the sample rack delivery process may be divided into a plurality of delivery paths. Wherein, the state of each of the position nodes may be an occupancy state or an available state. When each of the position nodes is in the occupancy state, it indicates that a sample rack is stayed at the position node. When the position node is in the available state, it indicates that the position node is in an idle state and is not occupied by any sample rack. In some embodiments, through the each of the position nodes, the total movement path of the sample rack may be divided into a seventh delivery path, an eighth delivery path, a ninth delivery path and a tenth delivery path. Wherein, the seventh delivery path may be a sample initial position to a sample adding buffer position or an emergency sample adding position or a recycling buffer position of a first target chemiluminescence detector; the eighth delivery path may be a sample adding buffer position to a conventional sample adding position of a same chemiluminescence detector; a plurality of eighth delivery paths may be provided and the number may be equal to that of the chemiluminescence detectors; the ninth delivery path may be a conventional sample adding position or an emergency sample adding position or a recycling buffer position of an $N^{th}$ chemiluminescence detector to the sample rack end position; the tenth delivery path may be a corresponding conventional sample adding position of an $i^{th}$ chemiluminescence detector to a corresponding sample adding buffer position or emergency sample adding position or recycling buffer position of an $(i+1)^{th}$ chemiluminescence detector, or the tenth delivery path is a corresponding emergency sample adding position of the $i^{th}$ chemiluminescence detector to a corresponding emergency sample adding position or conventional sample adding position or recycling buffer position of the $(i+1)^{th}$ chemiluminescence detector, or the tenth delivery path is a corresponding recycling buffer position of the $i^{th}$ chemiluminescence detector to the corresponding emergency sample adding position or conventional sample adding position of the $(i+1)^{th}$ chemiluminescence detector. Wherein, there are N chemiluminescence detectors ($N \geq 2$, the N is the positive integer), $1 \leq i \leq N$ and the i is the positive integer. The control method for each of the delivery paths is similar to that for the first delivery path to the sixth delivery path in the method of the embodiments, can be specifically referred to the description above and will not be illustrated one by one.

It should be understood by those of ordinary skill in the art that all or some of the steps of the method embodiments can be implemented by program instruction related software. The program described above may be stored in a computer-readable storage medium. The program, when being executed, executes the steps of the method embodiments described above. Herein, any reference used by each embodiment provided by the present disclosure to a storage, a memory, a database or other media may include non-volatile and/or volatile memory. The non-volatile memory may include a Read-Only Memory (ROM), a Programmable ROM (PROM), an Electrically Programmable ROM (EPROM), an Electric Erasable Programmable ROM (EEPROM) or a flash memory; the volatile memory may include an Random Access Memory (RAM) or an external high-speed cache memory. As an illustration but not a limitation, the RAM may be available in multiple forms, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM) and a Rambus Dynamic RAM (RDRAM), etc.

Meanwhile, the embodiment of the present disclosure provides a sample rack scheduling control system. The sample rack scheduling control system includes a processor and a memory used for storing a computer program; and when the processor executes the computer program, the method of any embodiment is executed. In some embodiments, when the processor executes the computer program, the following steps are executed.

A state of each position node on each preset delivery path is obtained, wherein the position nodes may be provided according to a total movement path of the sample racks, and the position nodes may include a sample rack start-stop position, a transfer position, a sample adding buffer position, a sample adding position (including a conventional sample adding position and an emergency sample adding position), a rail changing position and a recycling buffer position. The state of each of the position nodes include an available state and an occupancy state, wherein the available state of each of the position nodes refers to that no sample rack is stayed on the position node, and the occupancy state of each of the position nodes refers to that the sample rack is stayed at the position node, and at this moment, the occupied position node cannot be used by other sample racks. In an exemplary embodiment, a plurality of position nodes may be formed into a plurality of preset delivery paths, the plurality of delivery paths may deliver the sample racks in parallel and each of the delivery paths may include a start position node and a target position node. For example, the delivery paths may include a path from the sample rack start-stop position to the sample adding buffer position, a path from the sample adding buffer position to the conventional sample adding position, a path from the sample adding position to the recycling buffer position, and a path from the recycling buffer position to the sample rack start-stop position.

For each of the delivery paths, if a target position node on the delivery path and position nodes between the target position node and a start position node all are in the available state, the target position node on the delivery path and the position nodes between the start position node and the target position node all are marked as the occupancy state, and a current sample rack at the start position node is controlled to move to the target position node, wherein the start position node is a first position node on the delivery path, an initial state of the start position node is in the occupancy state, and the target position node is a last one position node on the delivery path. In an exemplary embodiment, there may be one or more position nodes between the target position node and the start position node. Of course, there also may be no position node between the target position node and the start position node, that is, only two position nodes (the start position node and the target position node) are included on the delivery path. At this moment, as long as the target position node is in the available state, the sample racks at the start position node can be controlled to start movement.

In the embodiment, through providing a plurality of position nodes, the total movement path of the sample racks may be divided into the plurality of delivery paths. When the target position node on each delivery path and the position nodes between the target position node and the start position node all are in the available state, it indicates that the delivery path is unblocked; at this moment, each of the position nodes on the delivery path can be marked as the occupancy state, and each of the sample racks at the start position node on the delivery path is controlled to move to the target position node. In this way, as long as the delivery path is unblocked, each of the sample racks can be started to be delivered; and thus, the parallel delivery for multiple sample racks is implemented, there is no need to wait to deliver a next sample rack after a previous one is delivered completely, the utilization rate of each transmission passage on the sample delivery apparatus is improved, and the delivery efficiency of the sample racks is improved.

In an exemplary embodiment, in order to facilitate the parallel control on each of the delivery paths, the control system may include a plurality of delivery path management modules and a control module. The control module is used for controlling start or end of the delivery of each of the sample racks. In an exemplary embodiment, the control module may be used for controlling each of the delivery path management modules. The plurality of delivery path management modules are provided corresponding to the plurality of delivery paths. Each delivery path management module is configured to record a total number of sample racks at a start position node of a corresponding delivery path, and when the corresponding delivery path is unblocked, control the delivery path to deliver the sample racks according to a preset sequence. In an exemplary embodiment, the control system may include a first delivery path management module used for managing the first delivery path, a second delivery path management module used for managing the second delivery path, a third delivery path management module used for managing the third delivery path, a fourth delivery path management module used for managing the fourth delivery path, a fifth delivery path management module used for managing the fifth delivery path, a sixth delivery path management module used for managing the sixth delivery path, and a control module. The control module may be used for controlling the first delivery path management module, the second delivery path management module, the third delivery path management module, the fourth delivery path management module, the fifth delivery path management module and the sixth delivery path management module.

In some embodiments, since there may be a plurality of second delivery paths, third delivery paths and sixth delivery paths, so the second delivery path management module, the third delivery path management module and the sixth delivery path management module may include a plurality of delivery path management units, and the specific number of the delivery path management units may be equal to that of the delivery paths. Therefore, through controlling each of the delivery path management modules via the control module, the parallel control for sample rack scheduling on each delivery path may be implemented.

In some embodiments, the number of the second delivery paths may be equal to that of the chemiluminescence detectors. N ($N \geq 1$, the N is the positive integer) second delivery paths may be provided. At this moment, the second delivery path management module may include N second delivery management units, and the N second delivery management units are provided in one-to-one correspondence with the N second delivery paths. The second delivery path management module may control the N second delivery management units. The number of the third delivery paths may be equal to that of the chemiluminescence detectors. N ($N \geq 1$, the N is the positive integer) third delivery paths may be provided. At this moment, the third delivery path management module may include N third delivery management units, and the N third delivery management units are provided in one-to-one correspondence with the N third delivery paths. The third delivery path management module may control the N third delivery management units. There may be (N−1) sixth delivery paths. At this moment, the sixth delivery path management module may include (N−1) sixth delivery management units. (N−1) sixth delivery management units are arranged in one-to-one correspondence with (N−1) sixth delivery paths. The sixth delivery path management module further may control the (N−1) sixth delivery management units. It should be understood that, the working principle of the control system in this embodiment is basically consistent with the execution process of each step in the control method and may be specifically referred to the description above.

Figure 10:
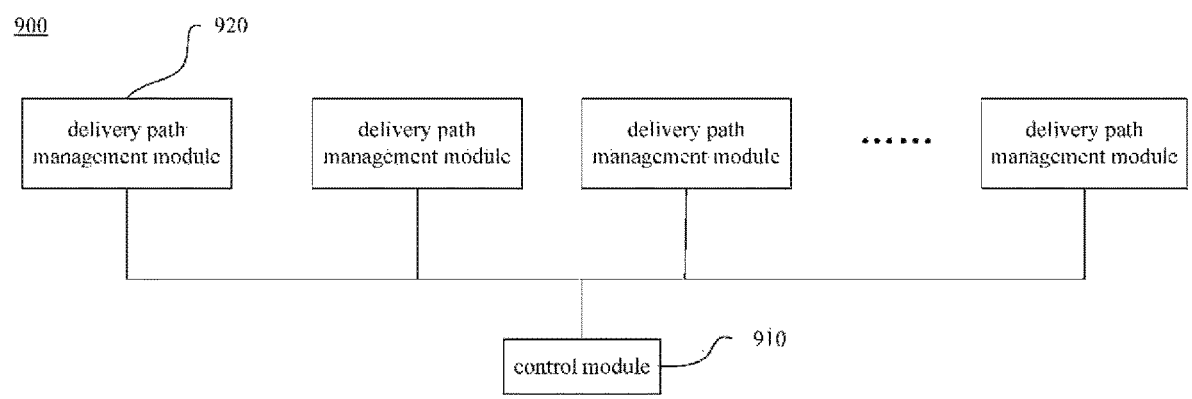
FIG. 10 is a structural block diagram of one embodiment of a sample rack scheduling control system of the preset disclosure.

In one embodiment, as shown in FIG. 10, the embodiment of the present disclosure provides a sample rack scheduling control system 900, which includes a delivery path management module 920 and a control module 910. Wherein, a plurality of delivery path management modules 920 may be provided and each delivery path management module 920 is used for obtaining a state of each position node on each preset delivery path, wherein the state of each position node include an available state and an occupancy state and the each preset delivery path includes a start position node and a target position node; and For each of the delivery paths, if a target position node on the delivery path and position nodes between the target position node and a start position node all are in the available state, the control module 910 is used for marking the target position node on the delivery path and the position nodes between the start position node and the target position node all as the occupancy state, and controlling a current sample rack at the start position node to move to the target position node, wherein the start position node is a first position node on the delivery path, an initial state of the start position node is in the occupancy state, and the target position node is a last one position node on the delivery path.

In addition, the embodiment of the present disclosure provides a medical detection device. The medical detection device includes one or more chemiluminescence detectors and the above sample rack scheduling control system. In an exemplary embodiment, each chemiluminescence detector is correspondingly provided with a sample adding mechanism, a sample bin mechanism and a sample delivery apparatus, and the structural characteristics may be referred to the above description.

According to the sample rack scheduling control method and system, and the medical detection device provided by the present disclosure, through providing a plurality of position nodes, a total movement path of the sample racks may be divided into multiple delivery paths. When the target position node on each delivery path and the position nodes between the target position node and the start position node all are in the available state, it indicates that the delivery path is unblocked; at this moment, each of the position nodes on the delivery path can be marked as the occupancy state, and each of the sample racks at the start position node on the delivery path is controlled to move to the target position node. In this way, as long as the delivery path is unblocked, the sample racks can be started to be delivered; and thus, the parallel delivery for a plurality of sample racks is implemented, there is no need to wait to deliver a next sample rack after a previous one is delivered completely, the utilization rate of each transmission passage on the sample delivery apparatus is improved, and the delivery efficiency of the sample racks is improved.

The above embodiments are only several embodiments of the present disclosure and are described concretely in detail, and thus should not be understood as limits to scope of the present disclosure. It should be noted that, those of ordinary skill in the art further may make several alternations and improvements without departing from the concept of the present disclosure, and all should pertain to the scope of protection of the present disclosure. Therefore, the scope of protection of the present disclosure should be subjected to the appended claims.

What is claimed is:

1. A sample rack scheduling control method, comprising:
respectively obtaining states of position nodes on each preset delivery path, wherein a state of each position node comprises an available state and an occupancy state and the each preset delivery path comprises a start position node and a target position node; and
for the each preset delivery path, in response to determining that a target position node on the each preset delivery path and position nodes between the target position node and a start position node all are in the available state, marking the target position node on the each preset delivery path and the position nodes between the start position node and the target position node all as the occupancy state, and controlling a current sample rack at the start position node to move to the target position node,
wherein the start position node is a first position node on the each preset delivery path, an initial state of the start position node is in the occupancy state, and the target position node is a last one position node on the each preset delivery path.

2. The sample rack scheduling control method as claimed in claim 1, further comprising:
for the each preset delivery path, in response to determining that the target position node on the each preset delivery path and/or the position nodes between the target position node and the start position node are in the occupancy state, controlling the current sample rack to be unmovable at the start position node of the each preset delivery path till the target position node on the each preset delivery path and the position nodes between the target position node and the start position node are in the available state.

3. The sample rack scheduling control method as claimed in claim 1, further comprising:
obtaining a current position node of a current sample rack on the each preset delivery path in real time; and
for the each preset delivery path, in response to determining that the current position node of the current sample rack is updated once, marking a previous one position node prior to the current position node as the available state.

4. The sample rack scheduling control method as claimed in claim 3, further comprising:
whenever the state of the each position node is changed into the available state, generating and sending resource a release signal corresponding to the each position node; and
according to the resource release signal corresponding to the each position node, obtaining the states of the position nodes on the each preset delivery path.

5. The sample rack scheduling control method as claimed in claim 1, further comprising:
respectively obtaining a total number of sample racks at the start position node on the each preset delivery path; and
for the each preset delivery path, in response to determining that the total number of sample racks at the start position node on the each preset delivery path is greater than zero, controlling the total number of sample racks at the start position node on the each preset delivery path to decrease progressively once, and taking one of the sample racks at the start position node on the each preset delivery path as a current sample rack.

6. The sample rack scheduling control method as claimed in claim 1, further comprising:
in response to determining that a target position node of one delivery path is overlapped with a start position node of another delivery path, when a sample rack on the one delivery path is moved to the corresponding target position node, controlling a total number of sample racks at the start position node on the another delivery path to accumulate once.

7. The sample rack scheduling control method as claimed in claim 1, wherein the each position node comprises a sample rack start-stop position, a transfer position, a sample adding buffer position, a conventional sample adding position, an emergency sample adding position, a rail changing position and a recycling buffer position provided on a single detection instrument;
when a plurality of detection instruments are spliced together, the plurality of detection instruments share the sample rack start-stop position and the transfer position corresponding to the first detection instrument; and the first detection instrument is connected with a sample bin mechanism.

8. The sample rack scheduling control method as claimed in claim 7, wherein the each preset delivery path comprises a first delivery path, a second delivery path, a third delivery path and a fourth delivery path;
a start position node of the first delivery path is the sample rack start-stop position, a target position node of the first delivery path is the sample adding buffer position or the emergency sample adding position corresponding to a first target detection instrument, and position nodes between the start position node and the target position node comprise the transfer position;
a start position node of the second delivery path is the sample adding buffer position, and a target position node of the second delivery path is the conventional sample adding position located on a same detection instrument with the sample adding buffer position;
a start position node of the third delivery path is the conventional sample adding position or the emergency sample adding position, a target position node of the third delivery path is the recycling buffer position located on a same detection instrument with the conventional sample adding position and the emergency sample adding position, and position nodes between the start position node and the target position node comprise the rail changing position located on a same detection instrument with the conventional sample adding position and the emergency sample adding position; and
a start position node of the fourth delivery path is the recycling buffer position on the first detection instrument, a target position node of the fourth delivery path is the sample rack start-stop position, and position nodes between the start position node and the target position node comprise the transfer position.

9. The sample rack scheduling control method as claimed in claim 8, wherein the each preset delivery path further comprises a fifth delivery path and a sixth delivery path;
a start position node of the fifth delivery path is a conventional sample adding position on an $i^{th}$ detection instrument, and a target position node of the fifth delivery path is a sample adding buffer position on a second target detection instrument, or a start position node of the fifth delivery path is an emergency sample adding position on an $i^{th}$ detection instrument, and a target position node of the fifth delivery path is an emergency sample adding position on a second target detection instrument, position nodes between the start position node and the target position node comprise rail changing positions of n detection instruments, the n is a number of instruments between the second target detection instrument and the $i^{th}$ detection instrument, n≥1, and the n is a positive integer;
a start position node of the sixth delivery path is a recycling buffer position on an $(i+1)^{th}$ detection instrument, a target position node of the sixth delivery path is a recycling buffer position corresponding to the $i^{th}$ detection instrument, and position nodes between the start position node and the target position node comprise a rail changing position of the $i^{th}$ detection instrument,
wherein 1≤i≤N, the i is the positive integer, the N is the total sets of the detection instruments, N≥2 and the N is the positive integer.

10. The sample rack scheduling control method as claimed in claim 9, wherein when the sample rack scheduling control method is used in a device comprising a plurality of detection instruments, the sample rack scheduling control method further comprises following step:
for each detection instrument, when each of the sample racks is moved to an emergency sample adding position or a conventional sample adding position of the detection instrument, controlling a sample adding mechanism of the detection instrument to suck up a sample.

11. A sample rack scheduling control apparatus, comprising a processor and a memory storing a computer program, and when the processor executing the computer program, the sample rack scheduling control method as claimed in claim 1 being executed.

12. A sample rack scheduling control apparatus, comprising a processor and a memory storing a computer program, and when the processor executing the computer program, the sample rack scheduling control method as claimed in claim 2 being executed.

13. A sample rack scheduling control apparatus, comprising a processor and a memory storing a computer program, and when the processor executing the computer program, the sample rack scheduling control method as claimed in claim 3 being executed.

14. A sample rack scheduling control apparatus, comprising:
a plurality of delivery path management modules, each delivery path management module being configured for obtaining states of position nodes on each preset delivery path, wherein a state of each position node comprises an available state and an occupancy state and the each preset delivery path comprises a start position node and a target position node; and
a control module, for the each preset delivery path, in response to determining that a target position node on the each preset delivery path and position nodes between the target position node and a start position node all are in the available state, used for marking the target position node on the each preset delivery path and the position nodes between the start position node and the target position node all as the occupancy state, and control a current sample rack at the start position node to move to the target position node,
wherein the start position node is a first position node on the each preset delivery path, an initial state of the start position node is in the occupancy state, and the target position node is a last one position node on the each preset delivery path.

15. A medical detection device, comprising one or more detection instruments and a sample rack scheduling control system as claimed in claim 14.

16. The medical detection device as claimed in claim 15, wherein each of the one or more detection instruments comprises a sample adding mechanism, a sample bin mechanism and a sample delivery apparatus, wherein the sample bin mechanism is used for storing a plurality of sample racks loaded with samples, the plurality of sample racks stored in the sample bin mechanism can be transferred to the sample delivery apparatus, the sample delivery apparatus is used for conveying the samples in the sample bin mechanism to sample adding positions, and the sample adding mechanism sucks up the samples at the sample adding positions.

17. The medical detection device as claimed in claim 16, wherein the sample delivery apparatus comprises:
   a sample transfer mechanism; and
   a sample delivery mechanism, wherein the sample transfer mechanism is provided between the sample bin mechanism and the sample delivery mechanism, the sample bin mechanism is provided with a delivery port, and the sample racks in the sample bin mechanism are transferred to the sample transfer mechanism by the delivery port and are delivered to the sample delivery mechanism by the sample transfer mechanism.

18. The medical detection device as claimed in claim 17, wherein the sample delivery mechanism comprises:
   a rail component; and
   a rail changing structure, wherein the sample transfer mechanism is in abutment joint with transmission passages of the rail component, so that the sample racks are transferred to the transmission passages of the rail component by the sample transfer mechanism.

19. The medical detection device as claimed in claim 17, wherein the sample transfer mechanism comprises a transfer rail, wherein when a passage is formed between the transfer rail and the delivery port of the sample bin mechanism, the sample racks stored in the sample bin mechanism are transferred to the sample transfer mechanism.

20. The medical detection device as claimed in claim 18, wherein the rail component comprises a first transmission passage, a second transmission passage and a third transmission passage, wherein the first transmission passage, the second transmission passage and the third transmission passage are provided in parallel.

\* \* \* \* \*